United States Patent
Gagnon et al.

(10) Patent No.: US 7,331,376 B2
(45) Date of Patent: Feb. 19, 2008

(54) STACKABLE ENERGY TRANSFER CORE SPACER

(75) Inventors: Martin Gagnon, Saint-Charles-de-Drummond (CA); Martin Gamelin, St-Francois du Lac (CA); Michel Julien, Drummondville (CA)

(73) Assignee: Venmar Ventilation Inc., Drummondville (CA)

( * ) Notice: Subject to any disclaimer, the term of this patent is extended or adjusted under 35 U.S.C. 154(b) by 411 days.

(21) Appl. No.: 10/739,412

(22) Filed: Dec. 19, 2003

(65) Prior Publication Data

US 2004/0226685 A1 Nov. 18, 2004

(30) Foreign Application Priority Data

Jan. 17, 2003 (CA) .................... 2416508

(51) Int. Cl.
*F28F 3/00* (2006.01)
*F24H 3/02* (2006.01)

(52) U.S. Cl. .................... 165/54; 165/166; 165/167

(58) Field of Classification Search ................ 165/54, 165/165–167, 78
See application file for complete search history.

(56) References Cited

U.S. PATENT DOCUMENTS

| 3,495,656 | A | * | 2/1970 | Dickson ................ 165/166 |
| 4,040,804 | A | | 8/1977 | Harrison |
| 4,051,898 | A | | 10/1977 | Yoshino et al. |
| 4,308,915 | A | | 1/1982 | Sander et al. |
| 4,377,400 | A | | 3/1983 | Okamoto et al. |
| 4,442,886 | A | | 4/1984 | Dinulescu |
| 4,460,388 | A | | 7/1984 | Fukami et al. |
| 4,461,344 | A | | 7/1984 | Allen et al. |
| 4,475,589 | A | * | 10/1984 | Mizuno et al. ............ 165/166 |
| 4,556,105 | A | * | 12/1985 | Boner ................ 165/165 |
| 4,848,450 | A | | 7/1989 | Lapkowsky |
| 4,971,144 | A | | 11/1990 | Gibson et al. |
| 5,072,790 | A | | 12/1991 | Lapowsky |
| 5,181,562 | A | | 1/1993 | Kuriki |
| 5,279,361 | A | | 1/1994 | Cohen |
| 5,322,117 | A | | 6/1994 | Guetersloh et al. |
| 5,474,639 | A | | 12/1995 | Alander et al. |
| 5,775,410 | A | | 7/1998 | Ramm-Schmidt et al. |
| 5,785,117 | A | | 7/1998 | Grinbergs |
| 5,829,513 | A | | 11/1998 | Urch |
| 5,832,993 | A | * | 11/1998 | Ohata et al. ................ 165/166 |
| 6,032,730 | A | | 3/2000 | Akita et al. |
| 6,059,025 | A | * | 5/2000 | Hossfeld ................ 165/166 |
| 6,413,298 | B1 | * | 7/2002 | Wnek et al. ................ 95/52 |
| 6,829,900 | B2 | * | 12/2004 | Urch ................ 62/3.2 |
| 2002/0185266 | A1 | | 12/2002 | Dobbs et al. |
| 2004/0118554 | A1 | | 6/2004 | Dobbs et al. |
| 2004/0140085 | A1 | | 7/2004 | Dobbs et al. |

FOREIGN PATENT DOCUMENTS

| CA | 1177821 | 11/1984 |
| CA | 1189062 | 6/1985 |
| CA | 2024098 | 3/1992 |

(Continued)

*Primary Examiner*—Tho Duong

(57) ABSTRACT

A stackable spacer element for use in a energy recovery core formed by stacking a plurality of relatively thin energy transfer media (e.g. sheets, panels, or plates (un-perforated exchanger sheets) so as to define a plurality of stacked energy transfer stages providing air passages for two separate air flows.

9 Claims, 20 Drawing Sheets

FOREIGN PATENT DOCUMENTS

| | | |
|---|---|---|
| CA | 2214487 | 3/1998 |
| FR | 1 551 747 | 12/1968 |
| FR | 2 381 990 | 9/1978 |
| JP | 57196091 A * | 12/1982 |
| JP | 403286995 | 12/1991 |
| JP | 403286996 | 12/1991 |
| NL | 8 204 761 | 7/1984 |
| WO | WO 93/18360 | 9/1993 |
| WO | WO 01/69154 | 9/2001 |

* cited by examiner

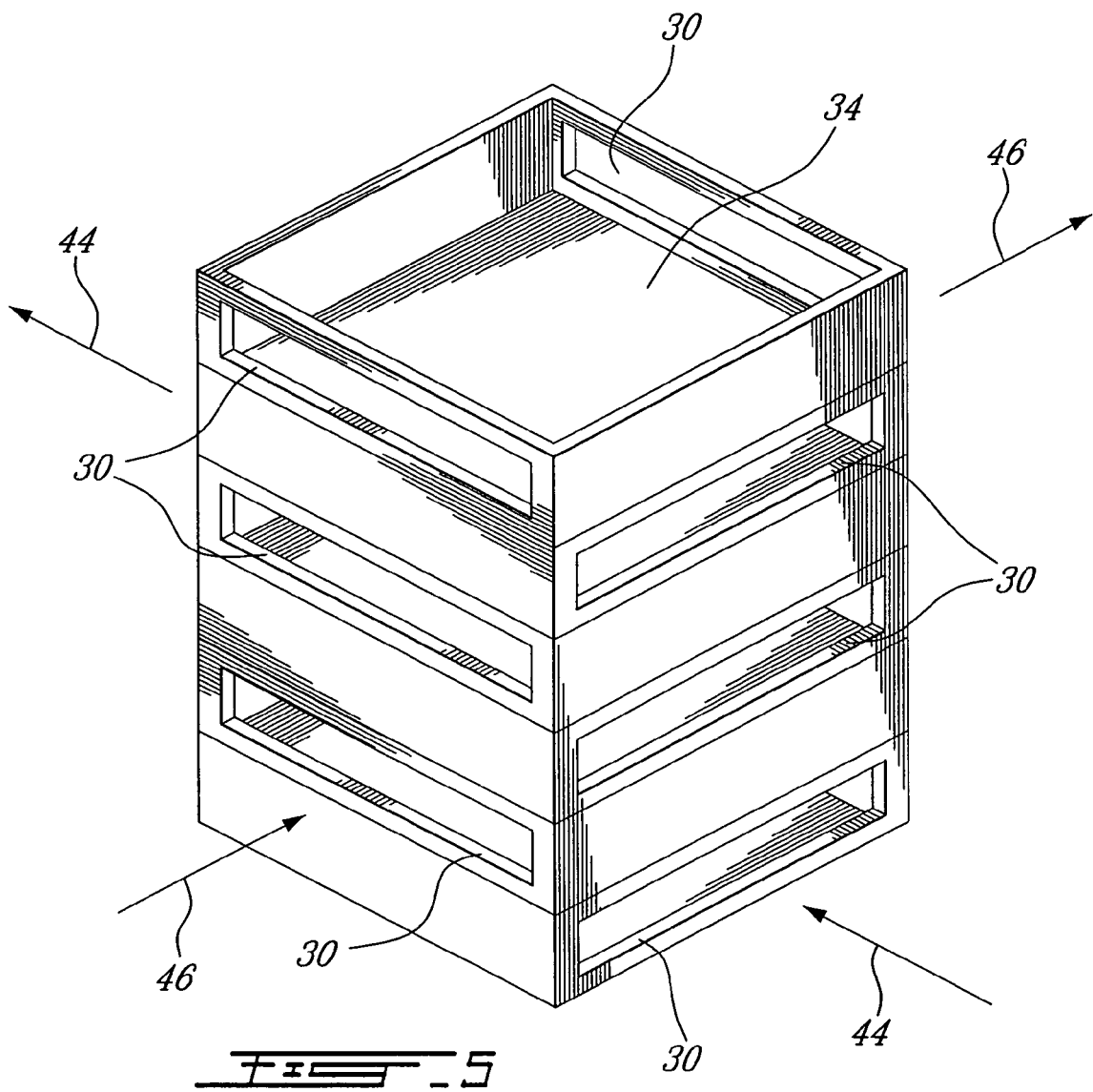
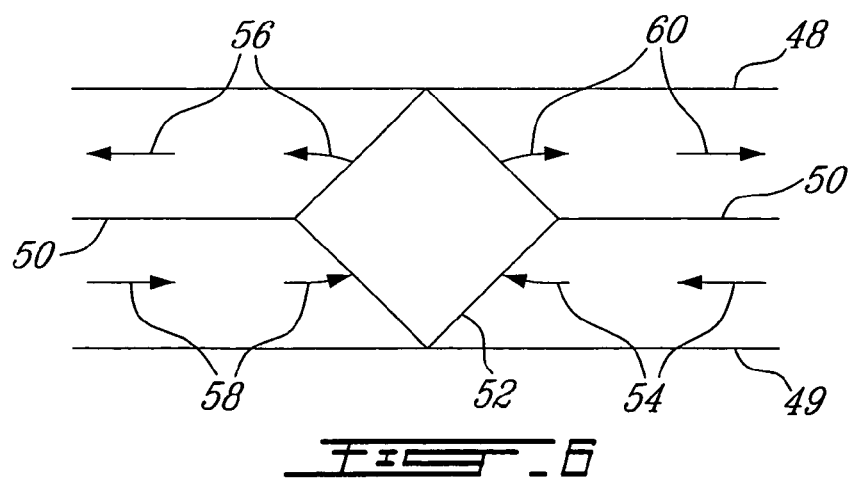

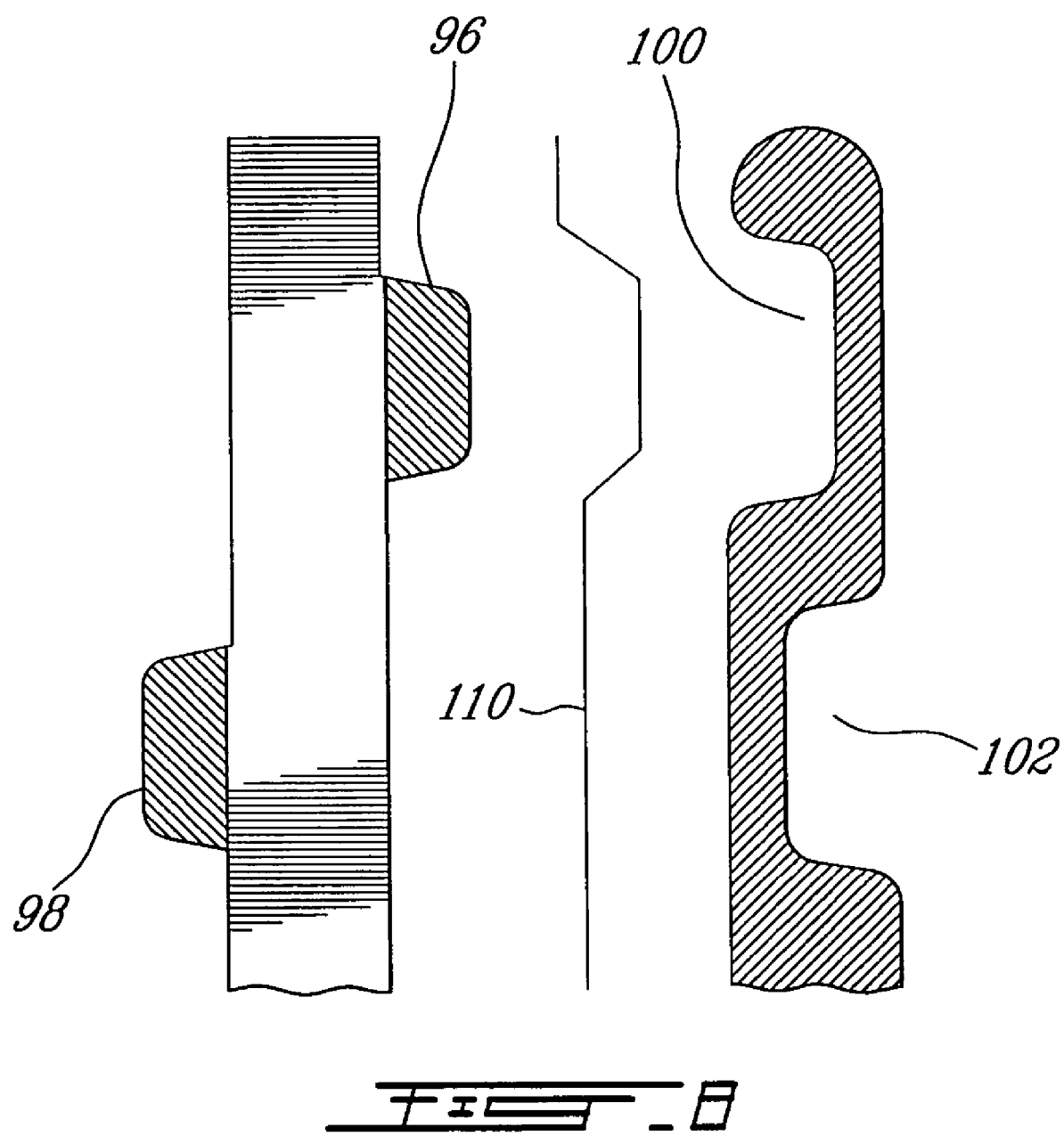

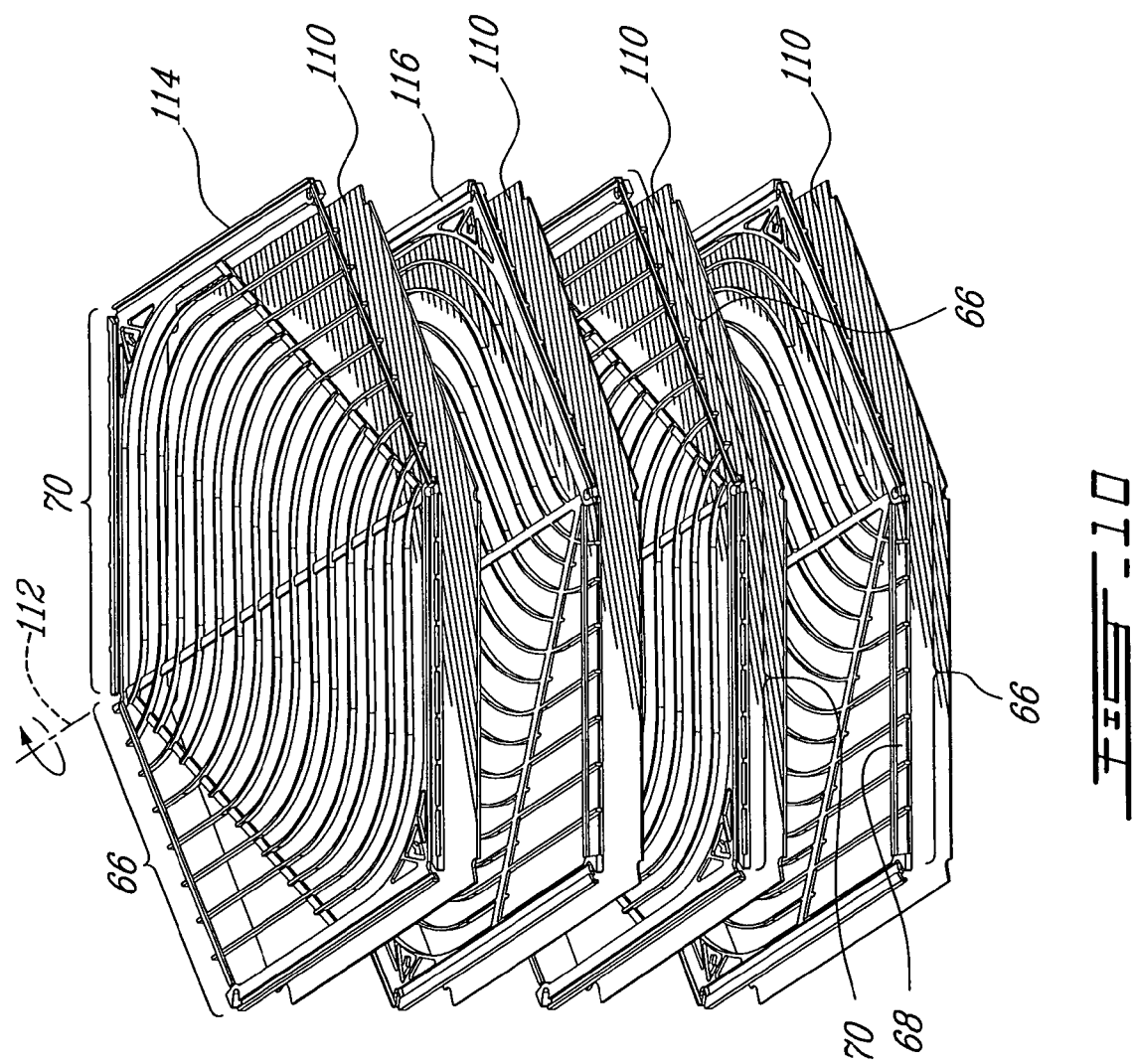

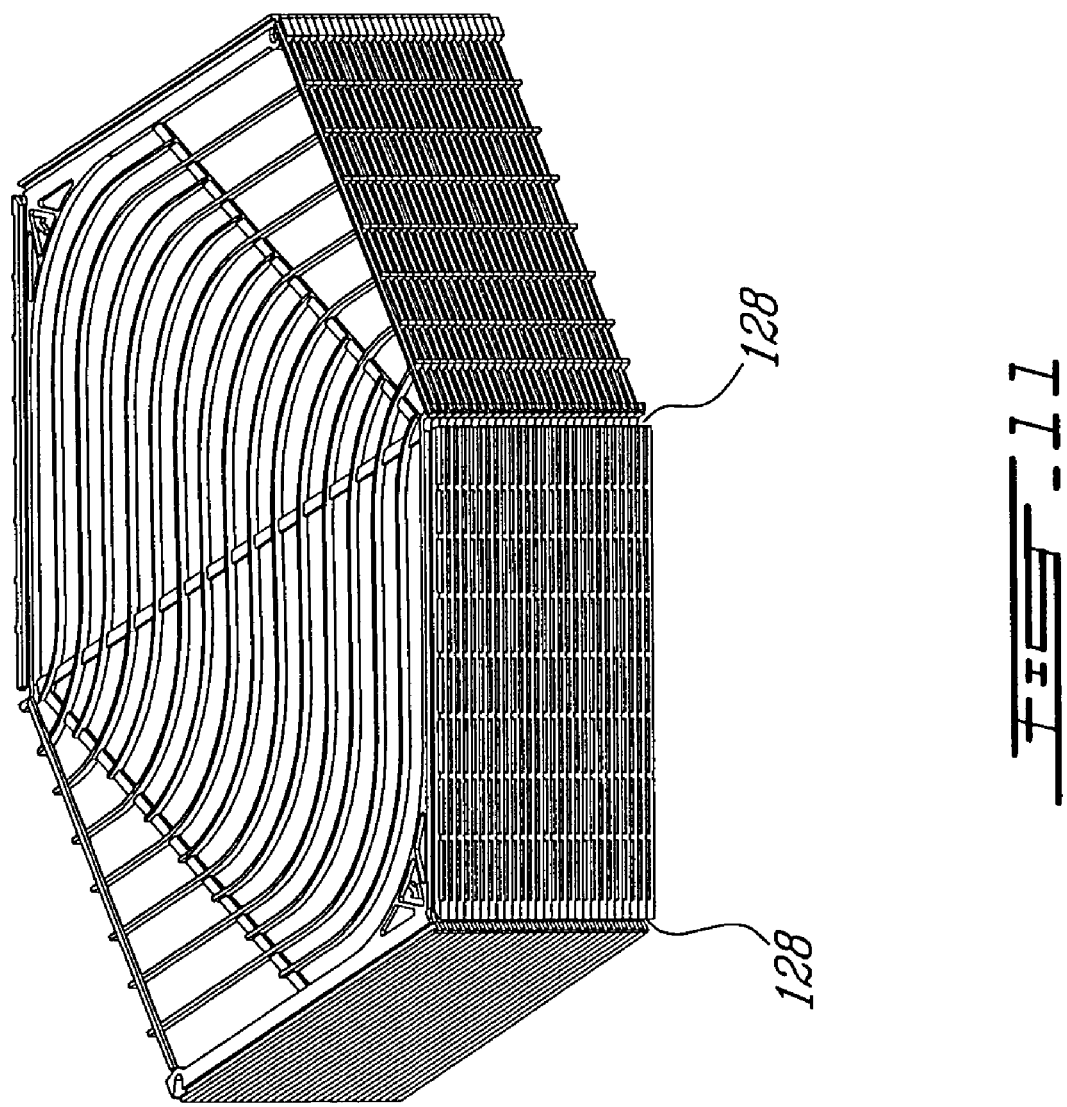

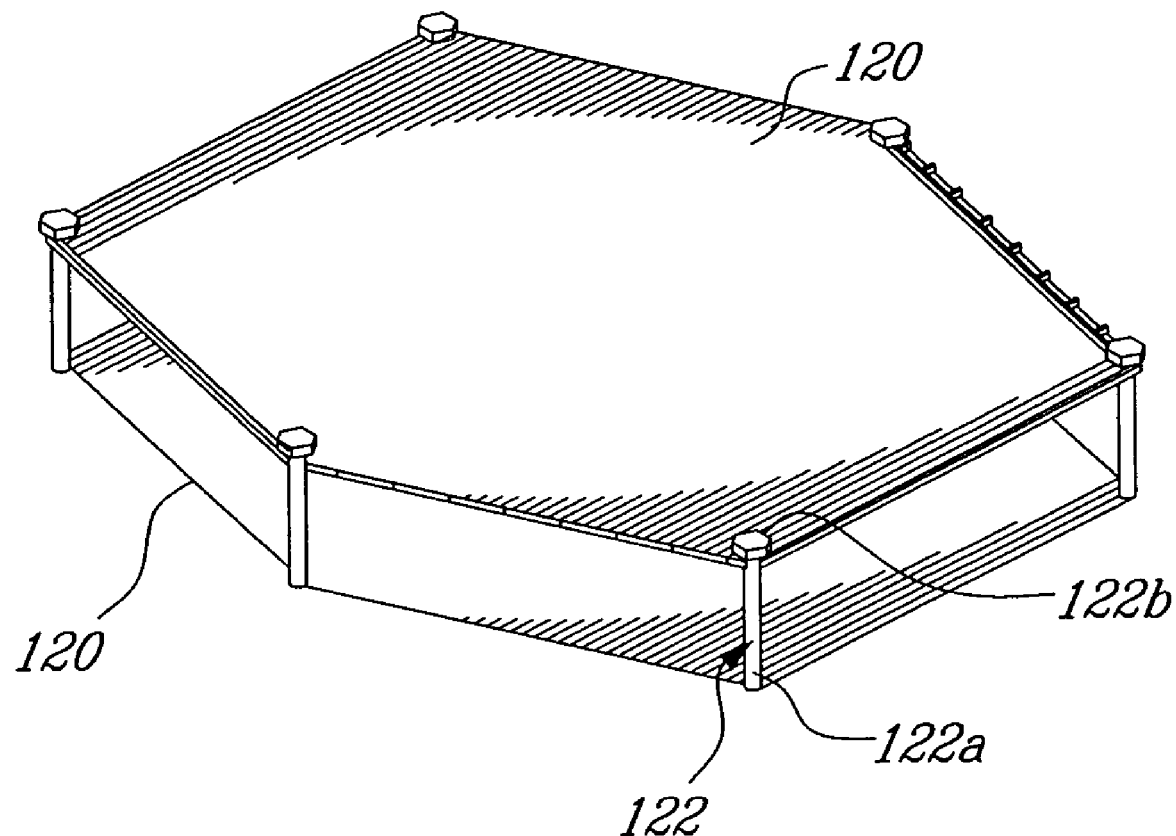

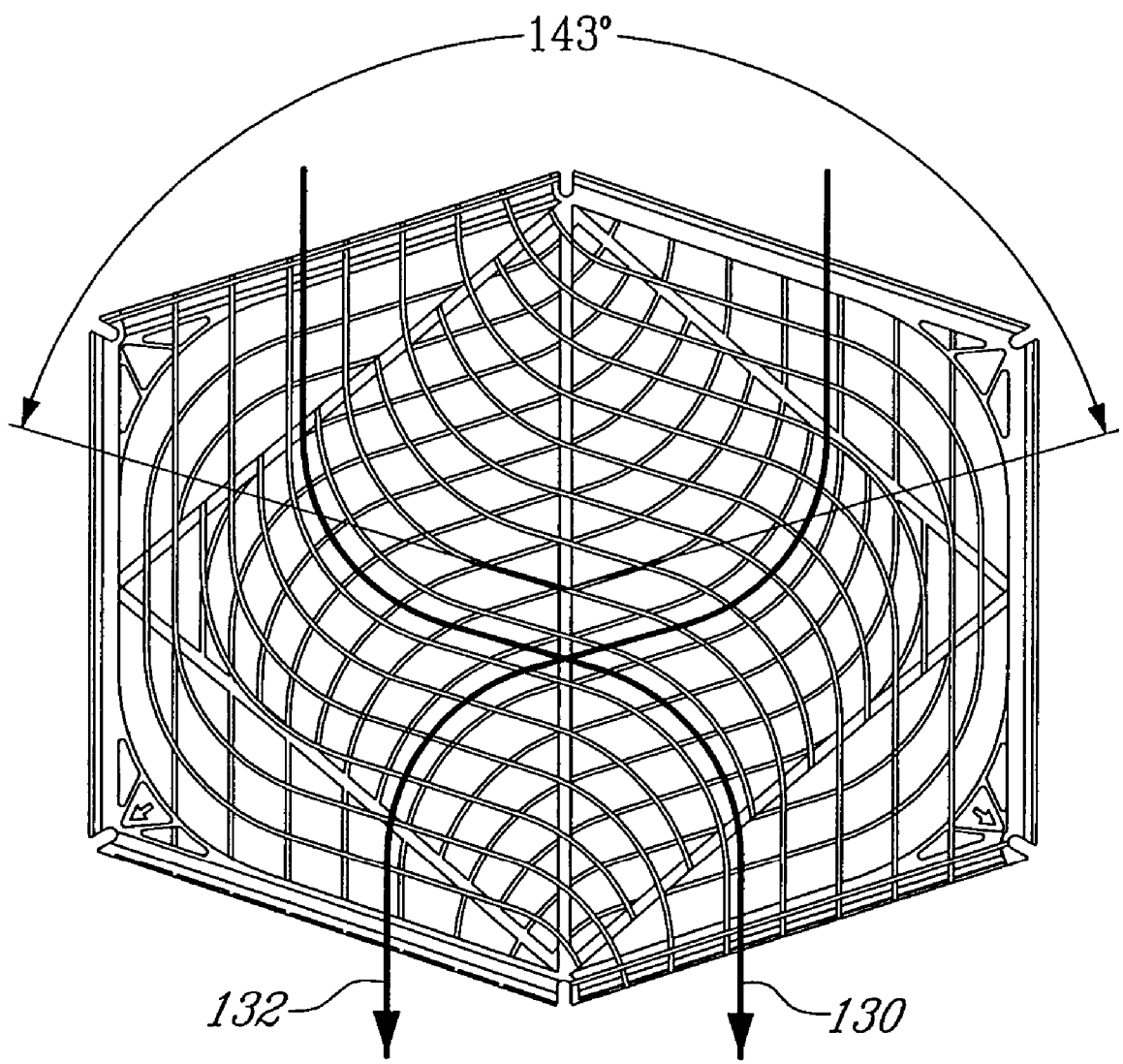

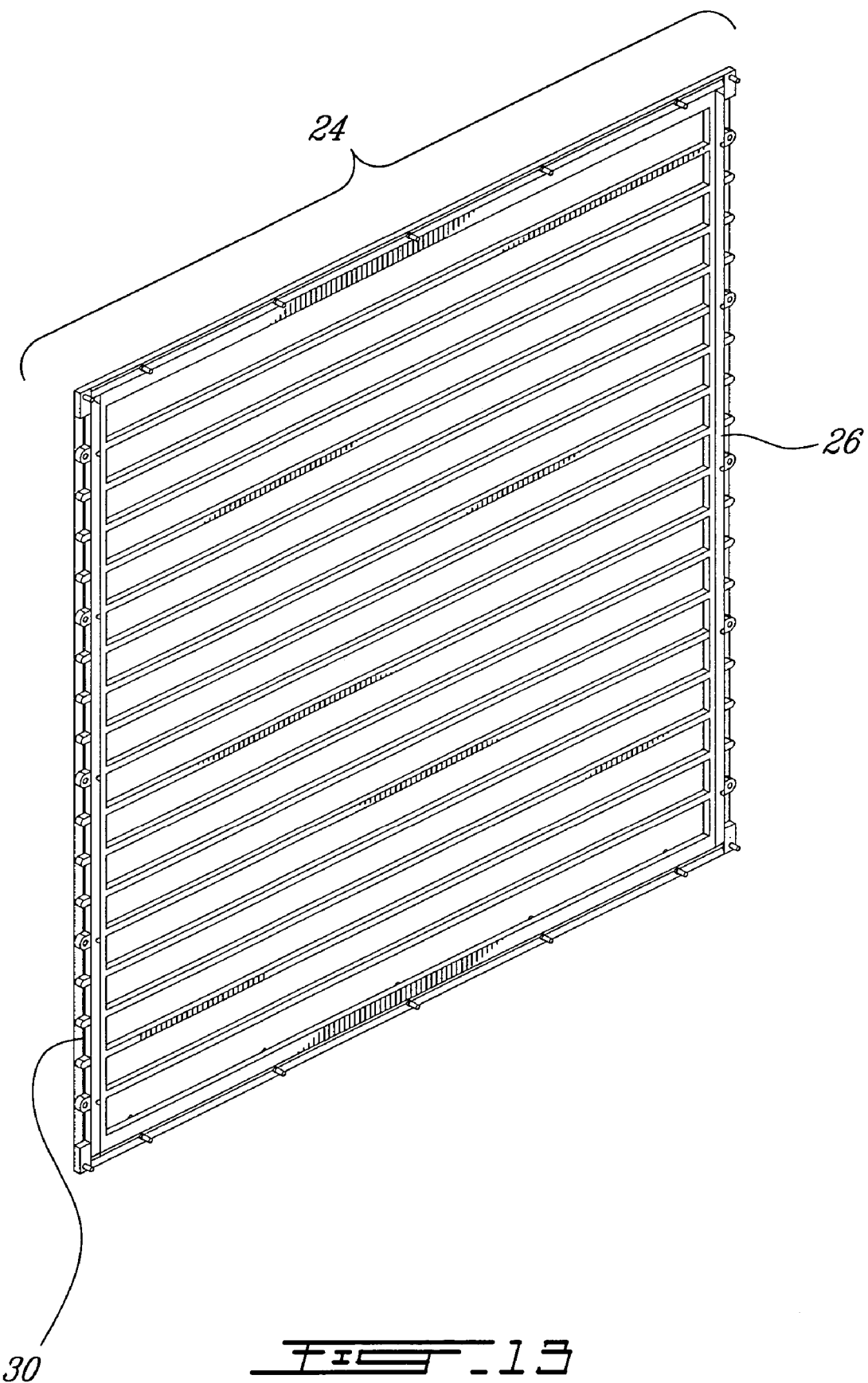

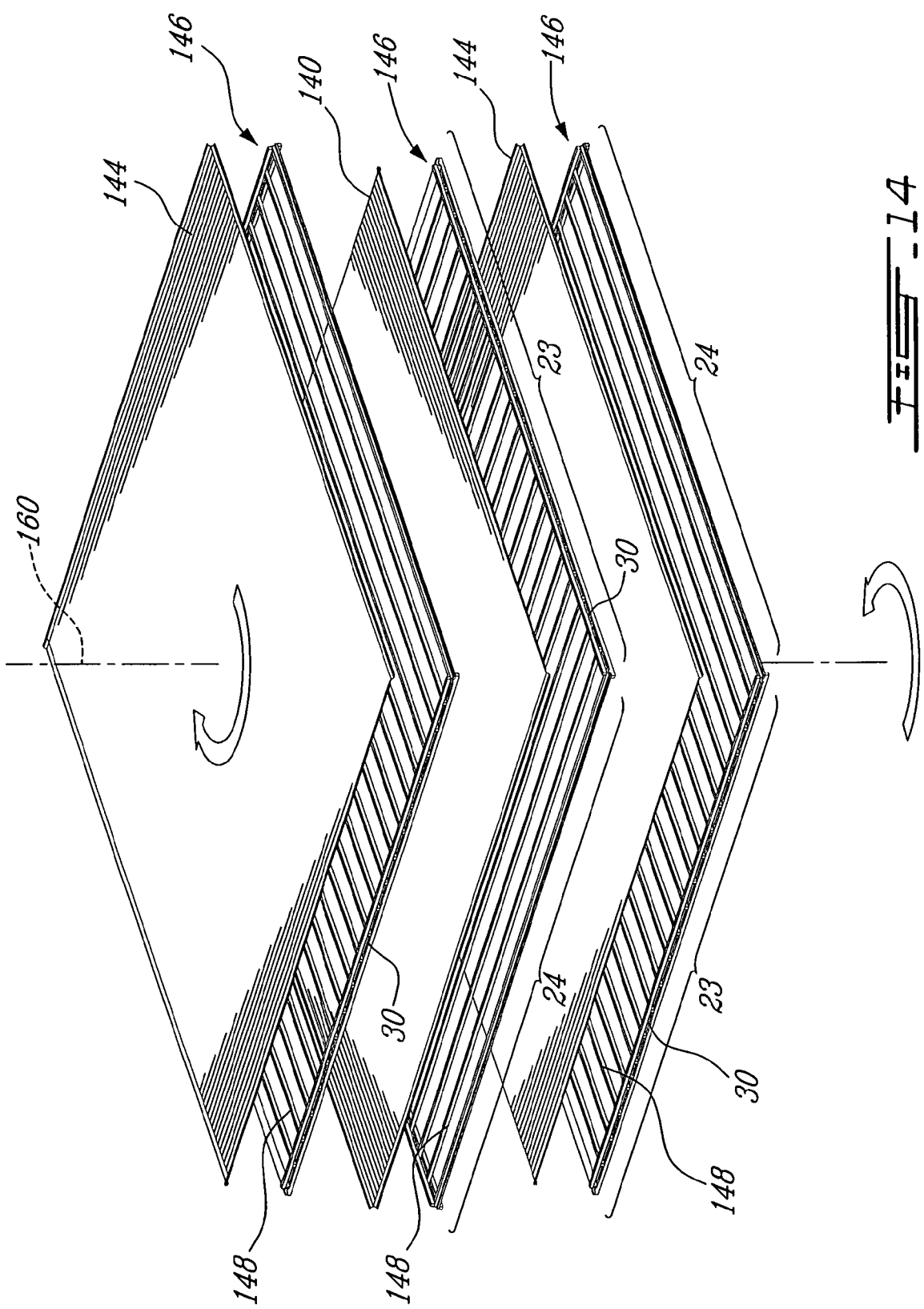

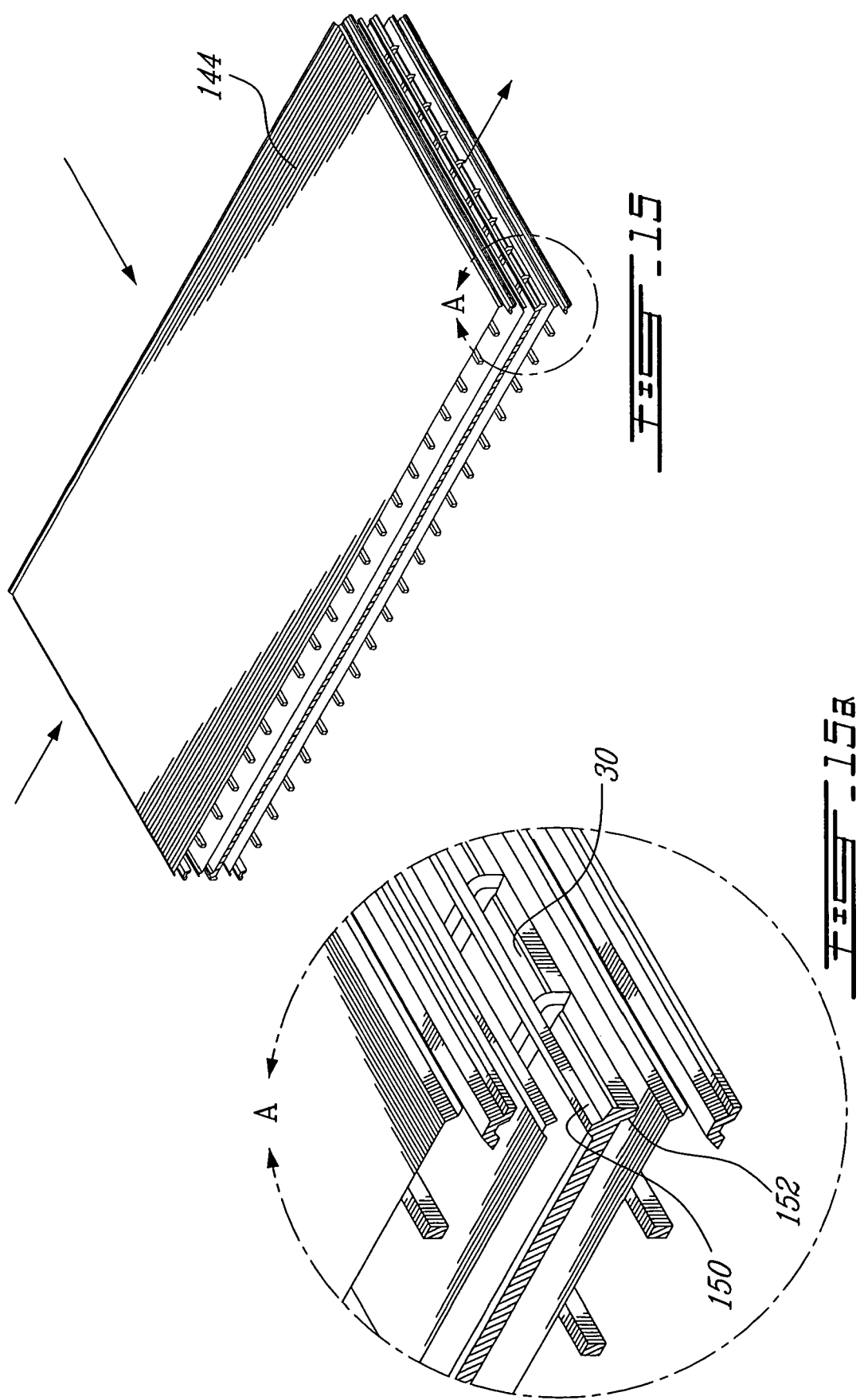

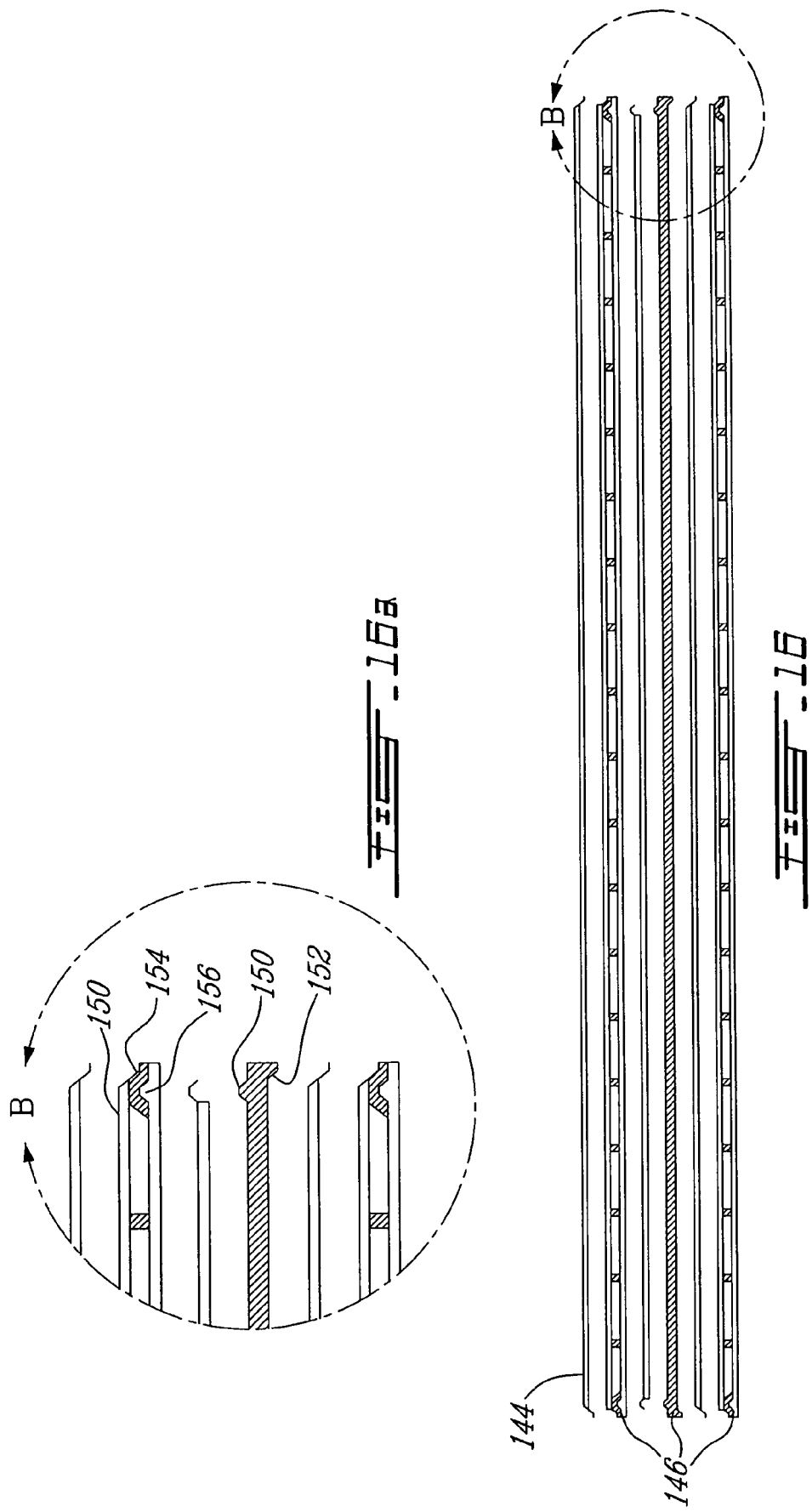

STACKABLE ENERGY TRANSFER CORE SPACER

This invention relates to an energy transfer element or stage which may be employed in an energy recovery core incorporated in an air conditioning system and a method of making such an energy transfer element or stage.

The present invention in particular relates to a stackable spacer element for use in an energy recovery core formed by stacking a plurality of relatively thin heat transfer media (e.g. sheets, panels, or plates (i.e. un-perforated exchanger sheets)) so as to define a plurality of stacked energy transfer stages providing air passages for two separate air flows, e.g. one for outside fresh air and one for stale interior air from an enclosure i.e. room of a building such as a house. The so formed energy recovery core may for example be used to transfer heat from discharged interior air to fresh atmospheric air. Thus for example the present invention relates to a heat recovery core of the cross-flow type, namely of the type wherein core air passages are disposed transverse (e.g. perpendicular) to each other in an interleaved fashion i.e. one passageway being transverse to the immediately adjacent passageway (or at least parts thereof). A suitably configured frame assembly may as desired or necessary be provided in contact with the bottom exchanger stage and the top exchanger stage for holding the plurality of stages in position as by a clamping type action.

Stacked type heat exchange cores are known for transferring heat between supplied atmospheric air and discharged interior air without allowing them to mix with each other; see for example U.S. Pat. Nos. 5,832,993 and 5,181,562. It is known that energy recovery cores may be of two types, namely cross flow cores and counter flow cores.

For cross flow cores it is known for example to use a corrugated board type heat exchanger in an air conditioning system or the like. In order to make such an exchanger, generally rectangular heat exchanging paper sheets and corrugated partitions are alternately stacked one on top of the other. The heat-exchange paper sheets and the corrugated partitions are also bonded to each other to preventing air from mixing between adjacent air passages. The directions of the partitions on opposite sides of a paper sheet are disposed so as to be oriented at right angles to each other such that two perpendicular air flow passages of triangular cross section are provided. Heat exchange is performed between air flowing through these air flow passages.

It is also known to provide an exchanger core made up of a plurality of heat exchange elements each of which comprises a heat exchanging paper sheet and a plurality of parallel vertically extending partition pieces formed from a synthetic resin. The partition pieces are vertically mounted on one side of the paper sheet; the synthetic resin partition pieces are formed integrally with the paper sheet. A large number of such heat exchange elements are stacked so that the direction of the partition pieces of each heat exchange element are alternately changed by 90 degrees. In this construction, each air flow passage has a rectangular cross section, which can reduce the air flow pressure loss as compared with the above-described corrugated core structure. However, producing the above-described heat exchange elements requires special production equipment and forming dies, resulting in relatively high production costs for this type of the heat exchange element. It would be advantageous to have an energy recovery element able to facilitate the manufacture of an energy recovery core for effective transfer of heat between fluids ((e.g. such as air) flowing through an energy recovery device. It would also be advantageous to be able to assemble an energy recovery core using self positioning spacer members. It would further be advantageous to be able to provide a peripheral energy transfer core spacer or use in the construction of an energy recovey core comprising a core stack comprising alternate layers of an energy transfer media of relatively thin material (e.g. sheets, plates, or the like) and spacer members. It would further be advantageous if a such energy transfer media and spacers could be stacked in successive, if so desired adhesive-less, layers so as to define a core. It would also be advantageous if the spacers could be provided with tongue/mortise aspects for interlocking adjacent spacers together.

STATEMENT OF INVENTION

Thus the present invention provides a stackable energy transfer core spacer comprising a peripheral frame member,
   said peripheral frame member extending about and defining a framed core opening,
   said peripheral frame member having a pair of opposed major sides,
   said peripheral frame member comprising
     a pair of side opening components and
     a pair of side wall components,
   each side opening component comprising a framed side opening in fluid (i.e. air) communication with said framed core opening,
   each side wall component respectively interconnecting said side opening components, said spacer being configured such that said spacer may be oriented and stacked, major side to major side, on top of a second like spacer, with an intermediate air to air energy transfer or exchanger sheet extending across (i.e. covering) the framed core openings and being sandwiched between the frame members of both spacers so that the spacers and the energy transfer sheet define a pair of transversely oriented (i.e. non-parallel) fluid (i.e. air) paths on opposite sides of the energy transfer sheet, each fluid (i.e. air) path extending from one respective framed side opening through a respective framed core opening to the other respective framed side opening of a respective spacer.

The present invention further provides a fluid to fluid (e.g. an air to air) energy recovery core having a first fluid (e.g. air) path and a separate second fluid (e.g. air) path, each fluid (e.g. air) path having a respective fluid (e.g. air) inlet and a respective fluid (e.g. air) outlet, said core comprising a stack of one or more successive energy transfer stages, each such stage comprising an energy transfer sheet having opposed major faces and a pair of spacers engaging opposite major faces of the sheet, each of said spacers being a spacer as defined herein, said spacers being oriented and disposed relative to each other so that the spacers and the energy transfer sheet define a pair of transversely oriented fluid (i.e. air) paths on opposite sides of the energy transfer sheet, each fluid (i.e. air) path extending from one respective framed side opening through a respective framed core opening to the other respective framed side opening of a respective spacer, the framed side openings of one frame member each respectively defining a respective element of the fluid (e.g. air) inlet and fluid (e.g. air) outlet of the first fluid (e.g. air) path and the framed side openings of the other frame member each respectively defining a respective element of the fluid (e.g. air) inlet and fluid (e.g. air) outlet of the second fluid (e.g. air) path.

In accordance with the present invention a stackable energy transfer core spacer may comprise a peripheral frame member wherein, on each major side thereof, the peripheral frame member comprises an inter-registrable tongue/mortise interlock element. In accordance with the present invention a frame member may be configured such that when the air to air energy transfer sheet is sandwiched between said frame member and the frame member of a second like spacer, the air to air energy transfer sheet is sandwiched between tongue/mortise interlock elements of said frame member and the frame member of said second like spacer.

In accordance with the present invention a stackable heat transfer core spacer (e.g. frame member thereof) may have a square configuration, a hexagonal configuration, etc.

In accordance with the present invention a spacer may, for example, further comprise, disposed in the framed core opening one or more (e.g. a plurality) elongated channel or rib elements which may as desired or necessary extend from one first framed side opening to the other, for guiding air between the framed side openings. In the latter case, a framed side opening may thus take on the form of a single opening or be comprised of a plurality of opening units, i.e. if guide rib elements are present. Alternatively, some or all of the channel or rib elements may extend to only one of the framed side openings and/or be disposed entirely within the framed core opening (i.e. not extending to a framed side opening. The channel or rib elements may be configured so as to facilitate fluid (e.g. air) flow between framed side openings through the framed core opening. The channel or rib elements may be connected to the frame member in any suitable desired or necessary manner. In accordance with the present invention the channel or rib air may merely rest up against the adjacent air to air heat transfer sheet, i.e. they are not attached to nor integral with the air to air heat transfer sheet.

A stackable energy transfer core spacer of the present invention may, for example, be a unitary (e.g. integrally molded) spacer of synthetic resin or plastics material.

A stackable energy transfer core spacer in accordance with the present invention may as mentioned above, be used for the construction of an energy transfer core (e.g. providing alternating cross-flow channels for energy or heat exchange between two fluid streams) wherein a plurality of like spacers are stacked in successive layers, with energy transfer media in the form of sheets or the (e.g. total heat transfer media) sandwiched between adjacent spacers, so as to define an energy transfer core. In other words, in accordance with the present invention an energy recovery core may thus comprise one or more (e.g. a plurality of) successive energy transfer stages, each such stage comprising an energy or heat transfer media in the form of a sheet (e.g. sheet panel or the like) and a pair of spacers disposed on opposite major faces of the media, said spacers comprising a peripheral frame defining a framed opening or space and a pair of peripheral framed edge openings communicating with the framed opening space. The framed edge openings may, for example, as mentioned herein, be on opposite sides of the frame member, i.e. the frame member may have a square configuration.

As may be understood, the frame member may be configured such that when a like spacer is stacked on top of a like spacer, with a fluid to fluid (e.g. air to air) energy transfer sheet sandwiched therebetween, the frame members of each spacer may engage the periphery of the energy transfer sheet so as to form a partition between the framed core opening of each spacer.

In accordance with the present invention the energy transfer media may sandwiched between the frame members of first and second adjacent spacers so as to define an air tight joints, the air tightness being provided by the presence of a suitable adhesive or be induced mechanically by any suitable clamping type mechanism which forces the opposed spacers to press together to squeeze the heat transfer media therebetween.

The spacer may take on any suitable configuration provided that it has the requisite side opening and side wall components which allow for an energy recovery core to be built up from a single spacer configuration, the core having a first inlet interconnected with a first outlet and a second inlet interconnected with a second outlet. Keeping the above in mind the spacer may have a circular shape; it may have a polygonal shape such as a square, hexagon, etc.

If the frame member of a spacer has a square configuration then the frame member may be configured such that when the spacer is oriented 90 degrees in its plane with respect to the like spacer and the like spacer is stacked on top of the spacer with heat transfer media therebetween the above mentioned air paths are defined by the spacers and heat transfer media on opposite sides of the energy transfer media (see below). Alternatively, instead of being rotated a spacer may have to be flipped over 180 degrees with respect to an underlying spacer; see for example the hexagonal configuration as described below.

The reference to the expressions "energy transfer sheet", "heat exchanger sheet" or the like is of course, to be understood herein, to be a reference to a sheet or the like which is non-permeable to fluid (e.g. air) so as to avoid mixing of air on opposite sides of the sheet; similarly with respect to the expression "energy transfer media".

As mentioned herein a frame member may further comprise on each of the opposite major sides thereof tongue/mortise interlock elements wherein a tongue interlock element is able to register with (e.g. in) a mortise interlock element so as to interlock adjacent like spacers with a heat exchange sheet panel sandwiched therebetween such that relative lateral movement (i.e. forward rearward and/or sideward movement) is inhibited.

It is to be understood herein that the word "sheet" in relation to the expressions "energy transfer sheet", "energy recovery sheet", "energy exchanger sheet" and the like is to include panels as well as plates and the like, i.e. an energy transfer media of relatively thin material (e.g. sheets, plates, or the like).

The energy exchanger or transfer sheet may be of any suitable (known) material able to facilitate sensible heat transfer and if so desired the transfer of humidity (i.e. water vapor) as well; in other words the sheet may be able to transfer of latent heat as well as sensible heat (i.e. total heat). Such heat transfer media sheets are known and can be made from numerous different materials, including specially treated paper sheets, fiberglass reinforced sheets or any other type suitable for the application.

It is to be understood herein that a tongue/mortise interlock element may comprise a tongue member, a mortise member or both.

It is also to be understood herein that a reference to the expression "inter-registrable tongue/mortise interlock element" as it is applied to a major side of a frame member characterises a "tongue/mortise interlock element" as being configured to register or be able to register with a "tongue/mortise interlock element" on a major side of the frame member of another like spacer. In other words the tongue/mortise interlock elements are to be configured such that when an air to air heat exchanger sheet is sandwiched between the frame members of a pair of like spacers, the tongue/mortise interlock element on the major side of one spacer is able to register with the tongue/mortise interlock element on the opposed adjacent major side of the other spacer disposed.

The tongue/mortise interlock elements on opposite major sides of a spacer may take on any desired or necessary configuration. It is, however, to be kept in mind that these elements are to respectively cooperate with the tongue/mortise interlock elements of like upper or underlying spacer(s) as the case may be such that when such spacers are stacked together the complementary tongue and mortise elements thereof define a pair of interlocked elements able to inhibit lateral displacement of the spacers relative to each other. These elements may also be exploited for the self alignment of one spacer with respect to another like spacer. The upper major side of a spacer may, for example, have a tongue element formed with a convex part(s) whereas the corresponding mortise element on the opposite major side may be formed with a complementary concave recess(es).

The tongue/mortise elements may for example be disposed so as to be spaced apart from the side ends of a spacer, so as to be disposed adjacent one side end or so as to extend from one side end to the other side end. The tongue/mortise elements of a spacer block may for example longitudinally extend along a side of a frame member either completely, partially or intermittently.

The member(s) of the tongue/mortise element of one major side of a frame member may be aligned with the member(s) of the tongue/mortise element of the other opposite major side of a spacer. Alternatively the opposed members may be offset (e.g. outwardly or inwardly) with respect to each other as, for example, discussed below.

Although like spacers may be provided with tongue/mortise interlock elements on opposite major sides thereof, such spacers may in accordance with the present invention nevertheless be provided with a tongue/mortise elements which are sized and configured relative to each other so as to permit limited adjustment (i.e. positional adjustment) of a spacer, i.e. to allow for a minor amount of clearance or play between the tongue/mortise interlock elements.

In drawings which illustrate example embodiments of the present invention

FIG. 5 is a schematic perspective view of an energy recovery core comprising a stack of spacers as shown in FIG. 3 and associated air to air heat transfer sheets;

FIG. 6 is a schematic cross section view of an energy exchange or recovery system incorporating the energy recovery core as shown in FIG. 5;

FIG. 8 is an enlarged schematic illustration of a partial cross sectional view of the peripheral edge of the spacer of FIG. 7 showing an example configuration for a spacer tongue and corresponding spacer groove for sandwiching therebetween a heat transfer media in place;

FIG. 10 is a schematic perspective view of a plurality of the example spacers as shown in FIG. 7 in the process of being associated with a plurality of air to air energy transfer sheet (e.g. paper) as shown in FIG. 9;

FIG. 11 illustrates an assembled counter/cross flow core made with the example spacers as shown in FIG. 7 and the energy transfer media shown in FIG. 9;

FIG. 11a is a schematic illustration of an example frame assembly for clamping together the components of the counter/cross flow core shown in FIG. 11;

FIG. 12 shows two spacers of FIG. 7 superimposed in stack fashion with the energy transfer media shown in FIG. 9 removed;

FIG. 13 is a schematic perspective view of an example square configuration of a spacer for incorporation into an energy recovery core for a cross air flow through the core;

FIG. 14 is a schematic perspective view of a number of square spacers, of another example type, shown in the process of being stacked in association with a number of respective air to air energy transfer sheets (e.g. paper);

FIG. 15 is an exploded perspective cross sectional view of the energy recovery core stack as obtained from the process shown in FIG. 14;

FIG. 15a is an enlarged view of the portion of FIG. 15 designated A;

FIG. 16 is a side view of the cross section shown in FIG. 15;

FIG. 16a is an enlarged view of the portion of FIG. 15 designated B;

Figure 1:
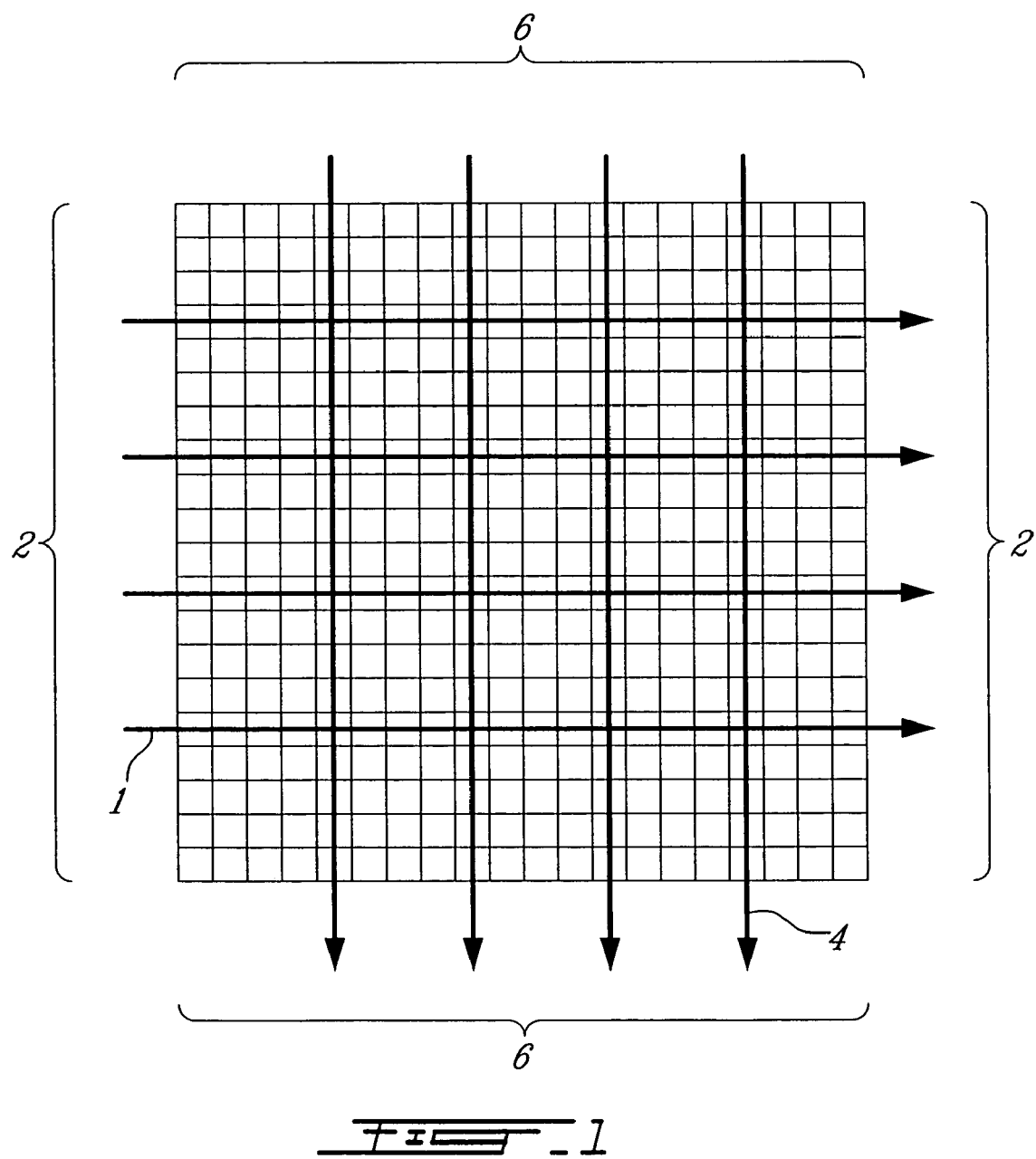
FIG. 1 is a schematic illustration of air flow for a cross flow type energy recovery core.

FIG. 1 is illustrative of air flow through a cross flow core; e.g. a square core or the like. In this configuration, two separate and unmixed airstreams are disposed at a 90° angle. Thus, a hot airflow (one arrow being designated by the reference number 1) is shown as crossing a pair of faces (both generally designated by the reference numeral 2) while the cold airflow (one arrow being designated by the reference number 4) is shown as crossing the other pair of faces (both generally designated by the reference numeral 6). This configuration is very compact, but efficiency is theoretically limited.

Figure 2:
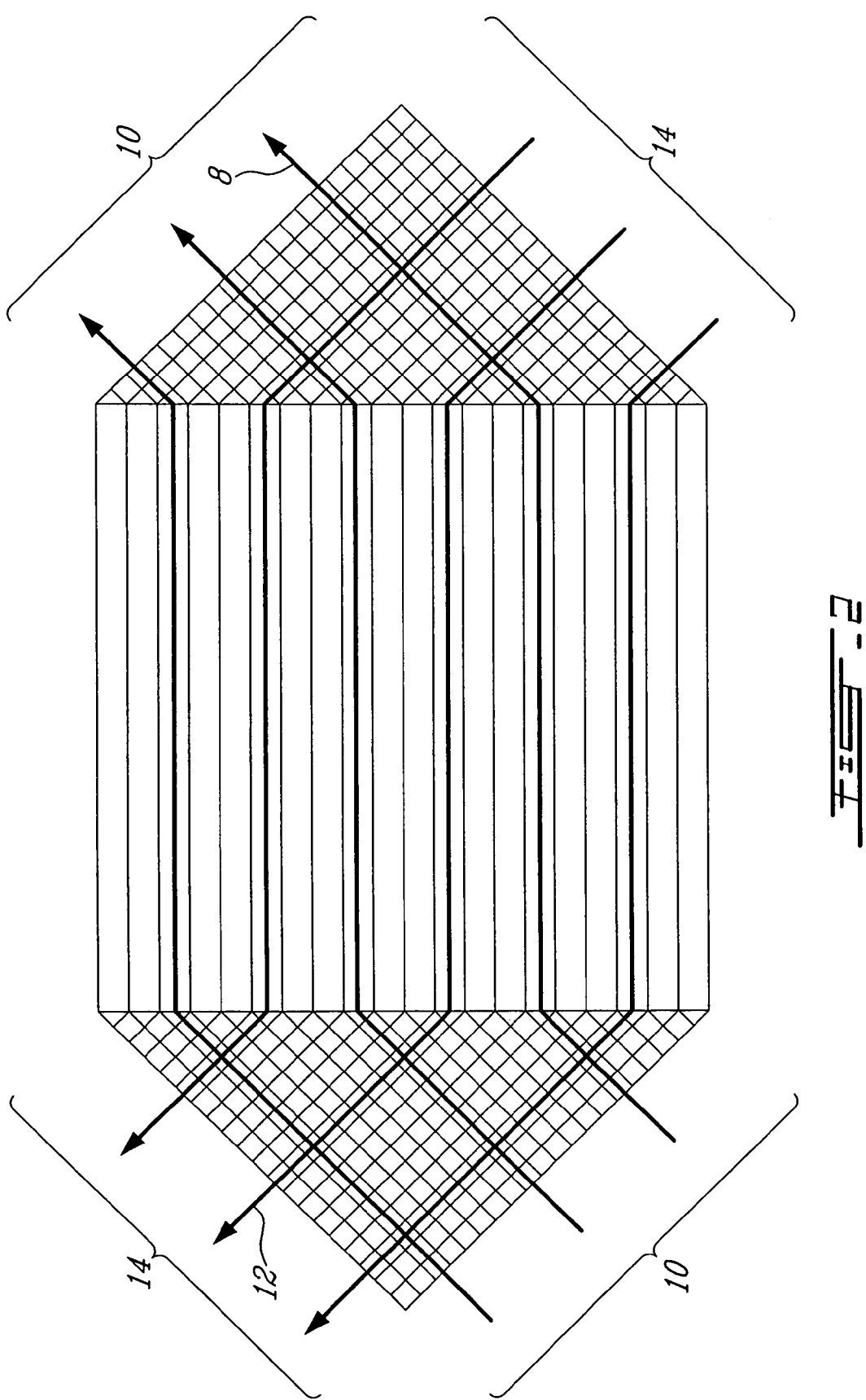
FIG. 2 is a schematic illustration of air flow for a counter flow type energy recovery core.

FIG. 2 is illustrative of air flow through a counter flow core. In this configuration, two separate and unmixed airstreams are disposed at a 180° angle. Thus, a hot airflow (one arrow being designated by the reference number 8) is shown as crossing a pair of faces (both generally designated by the reference numeral 10) while the cold airflow (one arrow being designated by the reference number 12) is shown as crossing the other pair of faces (both generally designated by the reference numeral 14). This arrangement is the best on the efficiency side, but more space is required. This is caused by the fact that two different airflows cannot get into the core by opposed faces. An inlet/exhaust region is required at each end of the core to separate hot and cold airflows.

Figure 7:
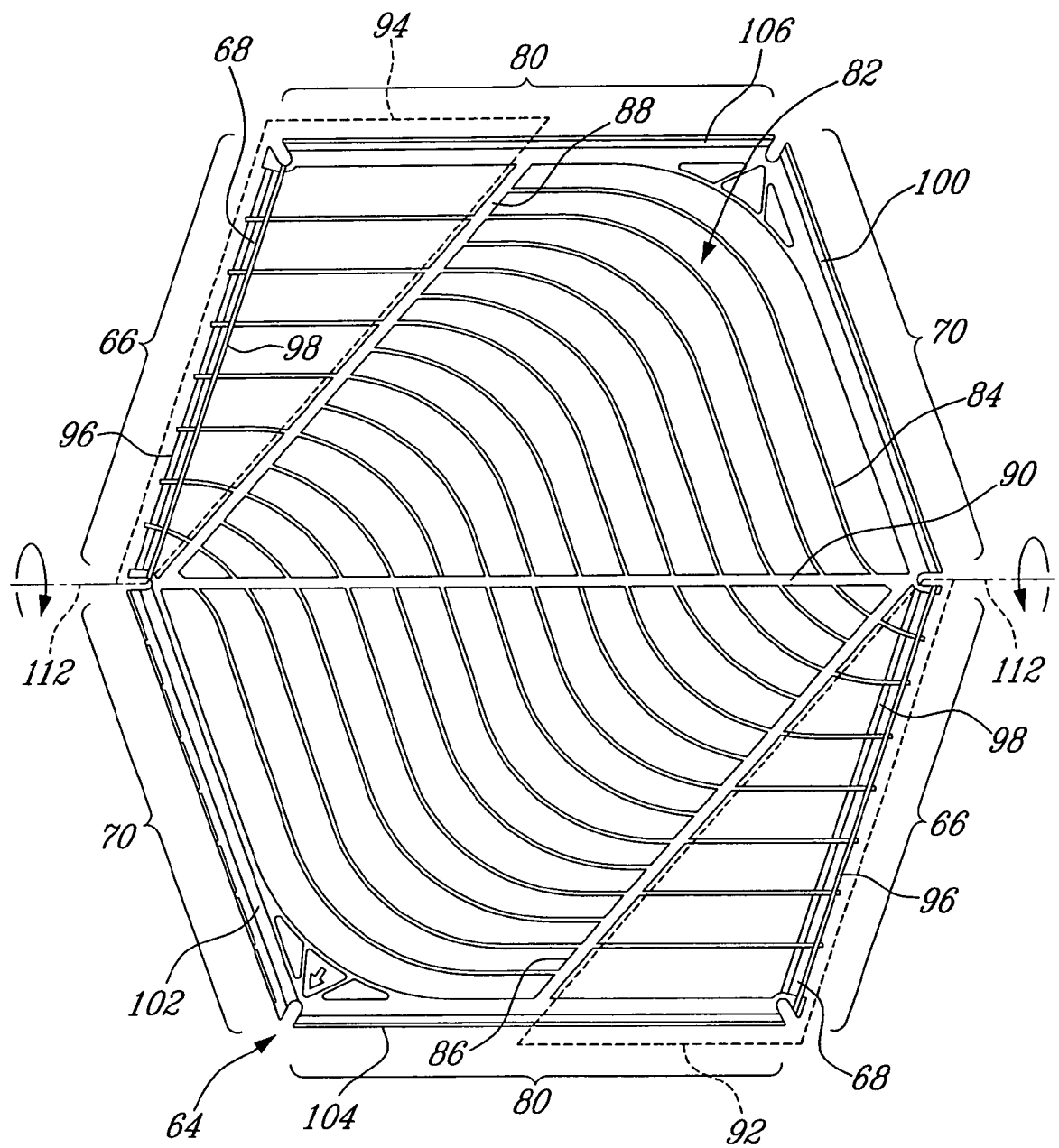
FIG. 7 is a schematic plan view looking down on one major side of an example configuration of a spacer for incorporation into an energy recovery core for a hybrid counter/cross air flow through the core.

Turning now to FIGS. 3 to 6, for the purpose of illustration the stackable spacer shown in FIGS. 3 to 6 has a frame member of somewhat exaggerated proportions in relation to the frame members shown with respect to the spacers illustrated in FIGS. 7, 13 and 14; as may be appreciated in the latter figures the frame members have a stick like aspect, i.e. a relatively thin aspect. The stackable spacer may be incorporated into an energy recovery core as shall be described below.

Figure 3:
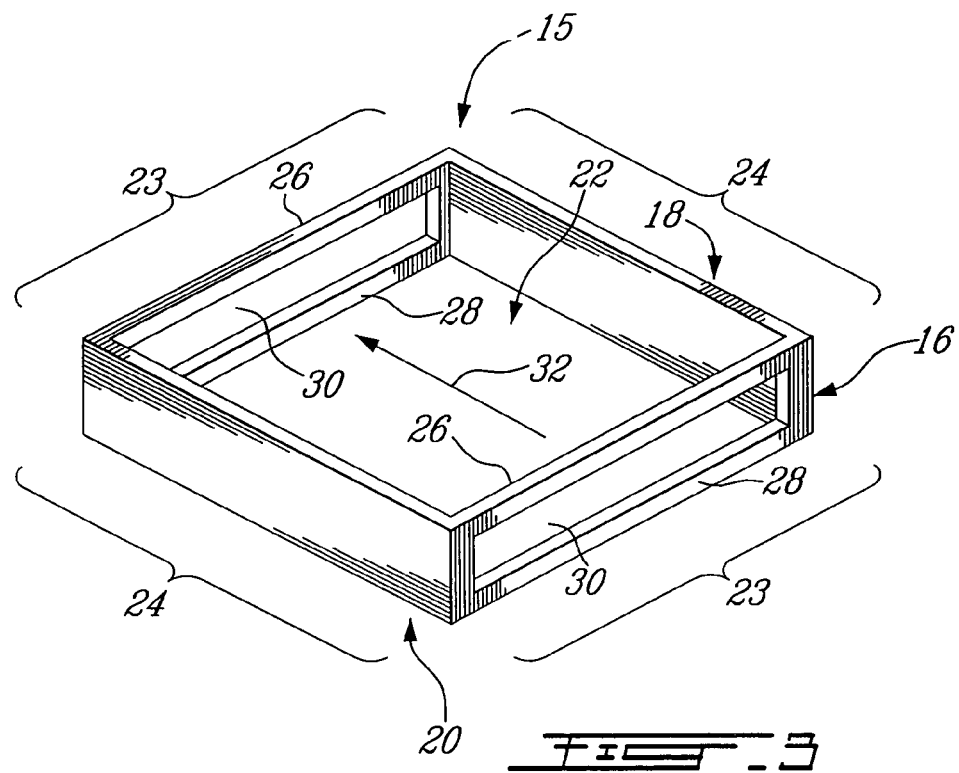
FIG. 3 is a schematic perspective view of an example square spacer in accordance with the present invention.

Referring to FIG. 3, the spacer 15 comprises a peripheral frame member 16 of square configuration. The frame member 16 also has a first major side (generally designated by the reference numeral 18) and an opposed second major side (generally designated by the reference numeral 20). The peripheral frame member 16 extends about and defines a framed core opening 22, i.e. the frame member 16 is disposed about the periphery of the framed core opening 22. In other words the framed core opening 22 extends from one major side 18 to the other major side 20 of the frame member 16. The peripheral frame member 16 comprises a pair of side opening components 23 and a pair of side wall components 24. Each side opening component 23 comprises a first element 26 and a second element 28 associated with a respective major side of the frame member 16. Thus the first elements 26 are associated with the major side designated by the reference numeral 18 and the second elements 28 are associated with the major side designated by the reference numeral 20. These first and second elements (26 and 28) are spaced apart so as to define a framed side opening 30. Each framed side opening 30 is in fluid (i.e. air) communication with the framed core opening 22, i.e. air may pass through one of the framed side openings 26 into the framed core opening 22 and then through the other framed side opening 26 as illustrated by arrow 32. Each side wall component 24 (i.e. imperforate wall members) respectively interconnects the side opening components, i.e. each pair of the shown first and second elements 26 and 28 is connected to both of the side wall components 24.

On each major side of the frame member 16, the frame member 16 has a peripheral square ring engagement surface. The engagement surface associated with the major side 18 as seen, has a portion thereof defined by each of the side wall components 24 and the first elements 26; similarly for the square ring surface associated with the other opposite major side 20 (hidden from view) has a portion thereof defined by each of the side wall components 24 and the second elements 28. Although each portion of the engagement surface on major side 18 is shown with an essentially flat engagement surface, the surfaces may alternatively take on any other suitable aspect. They may for example take on a tongue and mortise aspect as discussed herein. In any event, as shall be further discussed below, the opposed engagement surfaces are both configured for engaging in sandwich fashion an air to air energy transfer sheet extending across the framed core opening 22. The engagement may, for example, be facilitated either through the use of a suitable adhesive material or by any suitable means for urging the spacers together in a mechanical pinching or clamping action about the exchanger sheet; the engagement is advantageously such that the energy transfer sheet may act as a kind of gasket so as to provide an air tight joint between adjacent engagement surfaces. If an adhesive is used it may be applied between one or both of the square ring engagement surfaces and a sandwiched energy transfer sheet.

Figure 4:
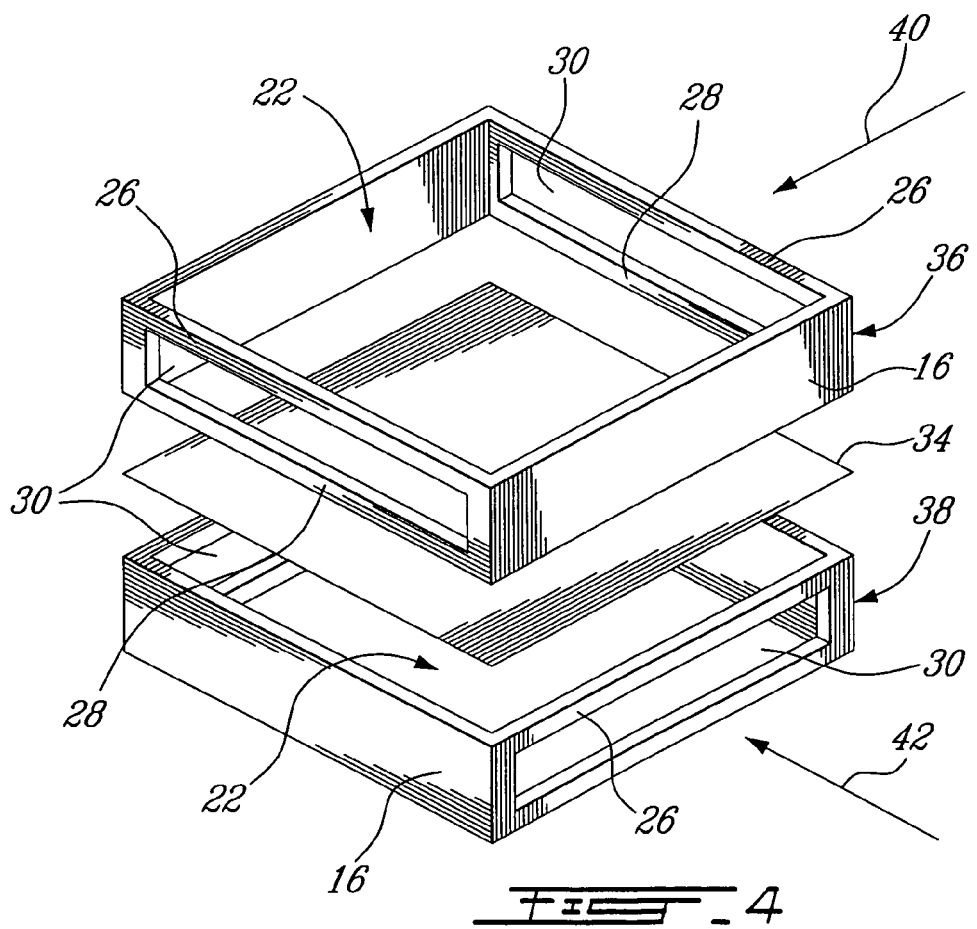
FIG. 4 is a schematic perspective view of a pair of the example spacers as shown in FIG. 3 in the process of being associated with an air to air energy transfer sheet (e.g. energy transfer paper)

Thus turning to FIG. 4, this figure shows a pair of the example spacers as shown in FIG. 3 in the process of being associated with an air to air energy transfer sheet 34 (e.g. paper). As may be understood the square frame member 16 of FIG. 3 is configured, such that in the view shown in FIG. 4, the first or top such spacer 36 may be oriented 90 degrees in its plane with respect to the lower like spacer 38 and be stacked (i.e. disposed), major side to major side, on top of the second such spacer 16b with the air to air energy transfer sheet 34 disposed therebetween. As may be understood the energy transfer sheet 34 extends across the framed core openings 22 and ita peripheral edge may be sandwiched between the frame members 16 of the first and second spacers 36 and 38. With the energy transfer sheet sandwiched between the frame members 16, the three part combination defines a pair of transversely oriented air (channels or) paths on opposite sides of the energy transfer sheet; each air path extends from one respective framed side opening 30 through the framed core opening 22 to the other respective framed side opening 30 of a respective spacer in the direction of the arrows 40 and 42. The energy transfer sheet 34 may be of any suitable (known) material able to facilitate sensible heat transfer and if so desired the transfer of humidity (i.e. water vapor) as well; in other words the energy transfer sheet 34 may be able to facilitate the transfer of latent heat as well as sensible heat. The reference to a "energy transfer sheet" is of course, as mentioned above to be understood herein to be a reference to a sheet or the like which is non-permeable to air so as to avoid mixing of air on opposite sides of the sheet.

Turning to FIG. 5, this figure illustrates an energy recovery core assembled together using a plurality of suitably oriented spacers as shown in FIG. 3 and a plurality of energy transfer sheets 34 as shown in FIG. 4. As may be appreciated air flow through the core may occur in the direction of the two arrows 44 and 46, the arrows respectively illustrating a first air path and a second air path through the core, i.e. through respective framed side openings 30. As also may be appreciated, the framed side openings 30 of alternating frame members each respectively define a respective element of the air inlet and air outlet of the first air path and the framed side openings of the other alternating frame members each respectively defining a respective element of the air inlet and air outlet of the second air path.

The core as shown in FIG. 5 may be completed by covering the exposed top and bottom spacer frame core openings by suitable end cap sheets. The top and bottom cap sheets or plates may as mentioned above be maintained in place by adhesive bonding to appropriate engagement surfaces or by suitable mechanical clamping (not shown) as is known in the art in relation to such multi-element cores; see for example the prior art as shown in U.S. Pat. No. 5,832,993 (FIG. 1 thereof) as well as FIG. 6 thereof. Please also see FIG. 11a for a further example of such mechanical structure.

As shown in FIG. 6, an energy recovery core assembled as shown in FIG. 5 may be incorporated into an air to air energy recovery system. The system is shown schematically in cross section. The system has an upper panel wall 48, a lower panel wall 49, and an intermediate partition wall 50 disposed intermediate between the upper and lower panels walls 48 and 49. The upper and lower panel walls 48 and 49 as well as the partition wall 50 together define upper and lower air paths. The heat-exchange core 52 is positioned between the upper and lower panel walls 48 and 49, across the partition wall 50 transversely to the upper and lower air paths so as to divert fresh air (arrows 54) from the lower path to the upper path (arrows 56) and exhaust air (arrows 58) from the lower air path to the upper air path (arrows 60). Thus cold exterior fresh air flowing through the lower air path may be diverted (pushed or pulled by a fan) through the heat-exchange core into the upper path for ultimate introduction into an enclosure whereas warm stale interior air drawn from the interior of the enclosure into the lower air path may be diverted through the core to the upper air path for ultimate expulsion into the atmosphere outside of the enclosure. It is to be understood that this separate cross over flow of these air streams through the core bring brings about an energy transfer from the warm to the cold air through the energy transfer sheets.

The fresh air introduced into the enclosure and the air discharged from the enclosure room flow through respective air passages or paths of the energy recovery core, perpendicularly to each other, the perpendicular air paths being defined by the alternately stacked spacers components as described above. Energy is transferred between the air introduced into the enclosure and the air discharged from the enclosure while they are flowing through respective air path or passages of the energy recovery core.

As mentioned above, a spacer may be configured to have (cooperating) tongue and mortise interlock aspects. Thus, for example, referring back to FIG. 3, the spacer illustrated may have (cooperating) tongue and mortise interlock aspects. In this case the frame member 16 on the first major side 18 of the spacer may comprise one or more interlock members (not shown) selected from the group of consisting of a tongue interlock member (e.g. male projection) and a mortise interlock member (e.g. female groove). Similarly, the frame member 16 on the second major side 20 of the spacer may comprise one or more interlock members (not shown) also selected from the group consisting of a tongue interlock member (e.g. male projection) and a mortise interlock member (e.g. female groove). It must however, be borne in mind that the selection and disposition of an interlock member for the first and second major sides of the spacer must be made on the basis that two like spacers (as shown in FIG. 4) are to be able to be stacked one on the other such that one like spacer may be oriented 90 degrees in its plane (as shown in FIG. 4) relative to the other like spacer. Such choice must at the same time be made on the basis that if the first major side of a spacer has a tongue interlock member, the second major side must have a corresponding cooperating mortise interlock member appropriately disposed and configured so as to allow the above mentioned orientation between like spacers and such that the tongue interlock member of one like spacer may register with the mortise interlock membert of the other like spacer so as to sandwich the exchanger sheet therebetween.

Thus, for example, referring back to FIG. 3, the portion of the engagement surfaces on each of the major sides 18 and 20 of the spacer as respectively defined by each first and second elements 26 and 28 of each side opening component 23 may take on a tongue aspect (e.g. male projection(s)). In other word, each first side opening component 23 may comprise a first tongue interlock element and a second tongue interlock element, the first and second tongue interlock elements each being disposed on a respective major side of the spacer and being spaced apart so as to define a framed side opening. On the other hand the portion of the engagement surfaces on each of the major sides 18 and 20 of the spacer as respectively defined by each side wall component 24 may, on each major side of the frame member, take on a corresponding mortise aspect (e.g. female groove (s)). In other words each second side wall component 24 may comprise a first mortise interlock element and a second mortise interlock element, the first and second mortise interlock elements each being disposed on a respective major side of the spacer. The tongue aspect and mortise aspects are of course disposed and configured to cooperate (i.e. have corresponding configurations or shapes) such that one of two adjacently stacked, like spacers, may be oriented 90 degrees in its plane relative to the other like spacer such that a tongue aspect(s) thereof may register with a mortise aspect(s) of the other spacer so as to sandwich the exchanger sheet therebetween. Although the frame member shown in FIG. 3 is square it could for example be modified to have a rounded or circular aspect, i.e. the straight sides may be curved.

Referring to FIG. 7, this figure shows another example spacer which is provided with tongue and mortise aspects. The illustrated spacer provides an air path configuration which is a hybrid configuration of those shown in FIGS. 1 and 2; i.e. the configuration is a mix between the cross flow and said counter flow configurations and is sometimes referred to herein as the counter-cross flow. The configuration nevertheless provides for transversely oriented air flow paths over at least a portion of the air flow through a core exploiting such configuration; see FIG. 12.

Figure 7A:
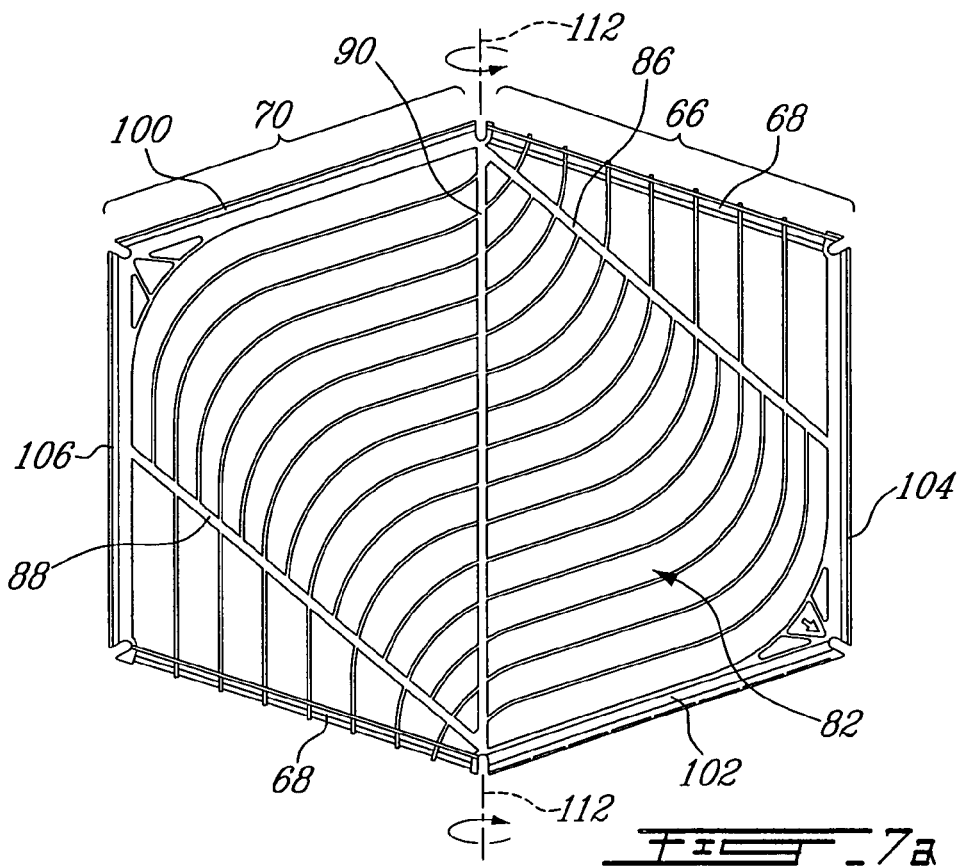
FIG. 7a is the same schematic plan view as shown in FIG. 7 but without the dashes outlining triangular zones.
Figure 7B:
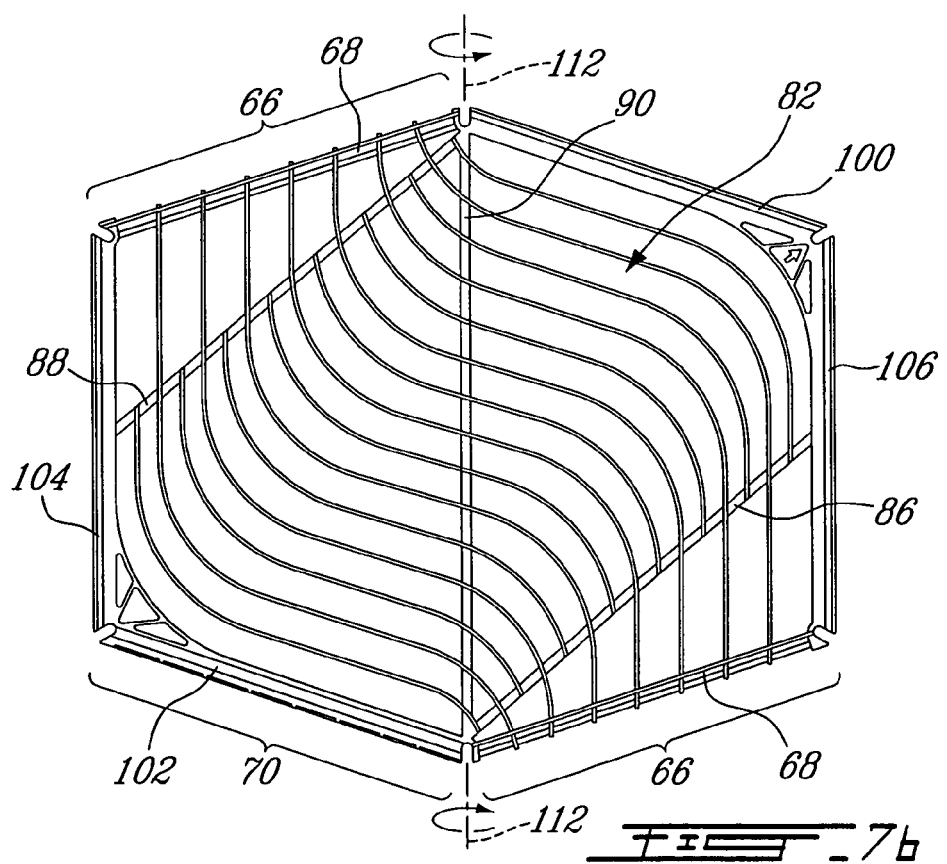
FIG. 7b is a schematic plan view of the example spacer shown in FIG. 7 looking down on the other or opposite major side as shown in FIG. 7 (i.e. the flip side)

Thus the stackable energy transfer core spacer shown in FIG. 7 comprises a peripheral tongue and mortise frame member designated generally by the reference number 64. The frame member 64 has a first major side (shown in FIG. 7a) and an opposed second major side (shown in FIG. 7b). The frame member 64 comprises a pair of side opening components 66 each of which defines a respective framed side opening 68 (see also FIG. 10) and which shall be described in more detail below. As in the case of the spacer embodiment illustrated in FIG. 3 the frame member 64 comprises a pair of side wall components (i.e. imperforate wall members). Each of the side wall components respectively interconnects the side opening components 64. However for the spacer embodiment shown in FIG. 7 each side wall component comprises two side wall elements 70 and 80 which give the illustrated spacer embodiment an hexagonal like shape when viewed in plan view as shown in FIGS. 7, 7a and 7b.

The frame member 64 extends about a framed core opening 82. A number of additional elements are disposed in the framed core opening 82, namely a plurality of air guide or rib elements (one such rib element begin designated by the reference numeral 84) which as shown take the form of "S" shaped air guiding members. The end tip of each rib guiding element is also rounded to minimize pressure drop. Furthermore, to increase the stiffness of the spacer, three stiffening members or elements 86, 88 and 90 are also disposed in the framed core opening 82; these stiffening members 86, 88 and 90, as seen, extend across the framed core opening 82 and have ends connected to the frame member 64. The stiffening members 86, 88 and 90 are also connected to the bottoms of the air guide or rib elements to provide support and stiffness thereto. The stiffening members 86, 88 and 90 are relatively thin as compared to the height of the air guide or rib elements so as to not block off the air channels ultimately definable by the air guide or rib elements (see for example the view of the spacer as seen in FIGS. 7b and 10).

Referring back to FIG. 7, the stiffening members 86 and 88 are so disposed as to define or form closed triangular structures with respective to portions of the frame member; these triangular structures or zones are indicated in outline generally by the dashed triangles 92 and 94.

As well as being connected to the stiffening members 86 and 88 half of the air guide or rib elements are connected at their respective ends to the side opening components 66 whereas the remaining half are connected at their respective ends to the stiffening members 86 and 88. In this manner the above mentioned triangular zones 92 and 94 also define adjacent to the framed side openings 68 of the side opening components 66 two low restriction zones. These low restriction zones have 50% less guiding members to reduce the amount of friction caused by the presence of the air guide or rib elements (e.g. plastic vanes).

Referring to FIGS. 7 and 10 the side opening components 66 comprise tongue members which are slightly shifted instead of being aligned. Therefore, corresponding mortise members shown herein as grooves need to be shifted to ensure tongue & groove fit with the previous and the next (e.g plastic) spacer in an energy recovery core stack. This type of tongue/mortise structure is advantageous in that it avoids expensive mold tooling (with side action mechanisms).

Thus each first side opening component 66 comprises a first tongue (interlock) element designated respectively 96 as well as an inwardly offset second tongue (interlock) element designated respectively 98. As may be seen the first and second tongue elements 96 and 98 are on opposite major sides of the frame member 64. As may be seen the inwardly offset second tongue interlock element 98 of one said first side opening components 66 is disposed on one major side and the inwardly offset second tongue interlock element 98 of the other of said first side opening components 66 is disposed on the other opposite major side.

Each pair of first and second tongue elements as may be appreciated are spaced apart so as to define the framed side opening 68, each framed side opening 68 being in fluid (i.e. air) communication with said framed core opening 82, i.e. in fluid (i.e. air) communication with the channels or paths defined by the air guide or rib elements 84.

As mention above each second side wall component comprises two side wall elements 70 and 80.

The side wall elements designated 70 each comprise a first mortise element 100 (i.e. a longitudinally extending groove) and an inwardly offset second mortise element 102 (i.e. a longitudinally extending groove) which are disposed on a respective opposite major sides of the frame member 64; see as well FIGS. 7a and 7b. The inwardly offset second mortise element 102 of one said side wall elements 70 is disposed on one of the major sides while the inwardly offset second mortise element 102 of the other of said second side wall elements 70 is disposed on the opposite major side of the frame member.

The first and second tongue elements 96 and 98 of the each first side opening component 66 is configured and disposed to be able to register with a respective first and second mortise element 100 and 102 of a respective side wall element 70 of an adjacent like spacer.

On the other hand the second wall elements designated 80 each comprise an first tongue element 104 (i.e. a longitudinally extending projection) aligned with a first mortise element 106 (i.e. a longitudinally extending groove) which are disposed on a respective opposite major sides of the frame member. The first tongue element 104 of one of said second side wall elements 80 is disposed on one of the major sides while the first tongue element 104 of the other of said second side wall elements 80 is disposed on the opposite major side of the frame member. The first tongue elements 104 are configured and disposed to be able to register with a respective first mortise element 106 of a respective side wall element 80 of an adjacent like spacer FIG. 8 illustrates in schematic fashion how the offset elements of the tongue/mortise means are able to register with each other to sandwich an air to air energy transfer sheet 110 therebetween i.e. the various elements are configured to matingly conform with each other.

Figure 9:
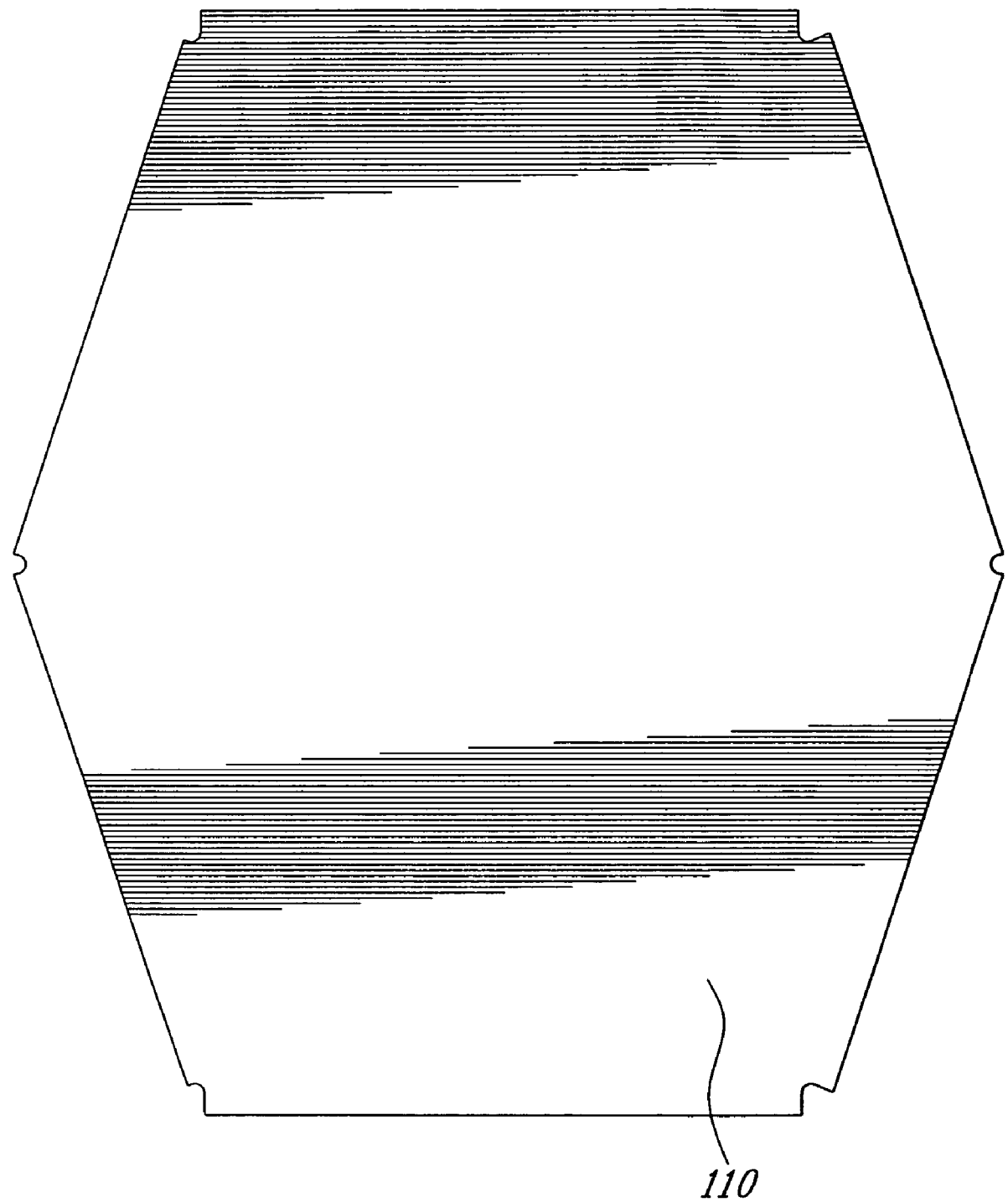
FIG. 9 is a schematic plan view of a sheet of an energy transfer media for disposition between a pair of spacers as shown in FIG. 7.
Figure 13A:
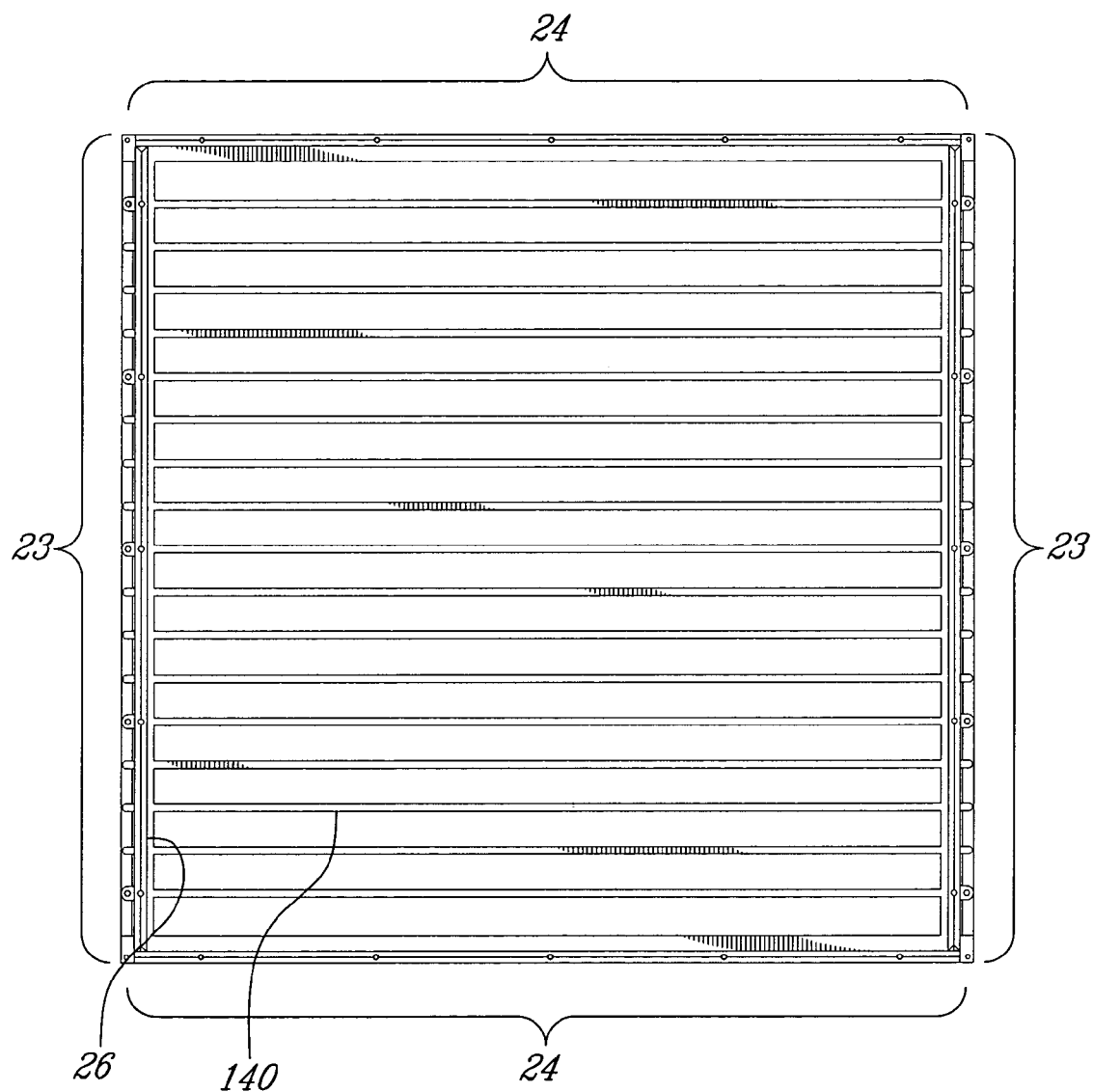
FIG. 13a is a schematic plan view looking down on one major side of the example square spacer shown in FIG. 13.
Figure 13B:
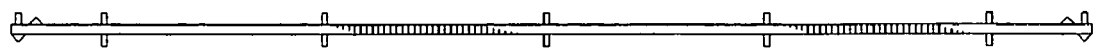
FIG. 13b is a schematic side view of a side wall component of the example square spacer shown in FIG. 13.
Figure 13C:
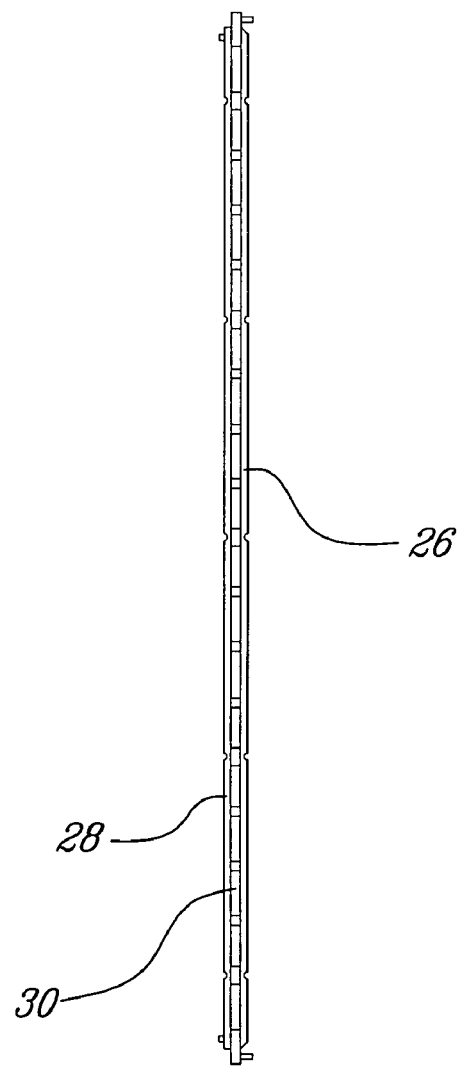
FIG. 13c is a schematic side view of a side opening component of the example square spacer shown in FIG. 13.
Figure 13D:
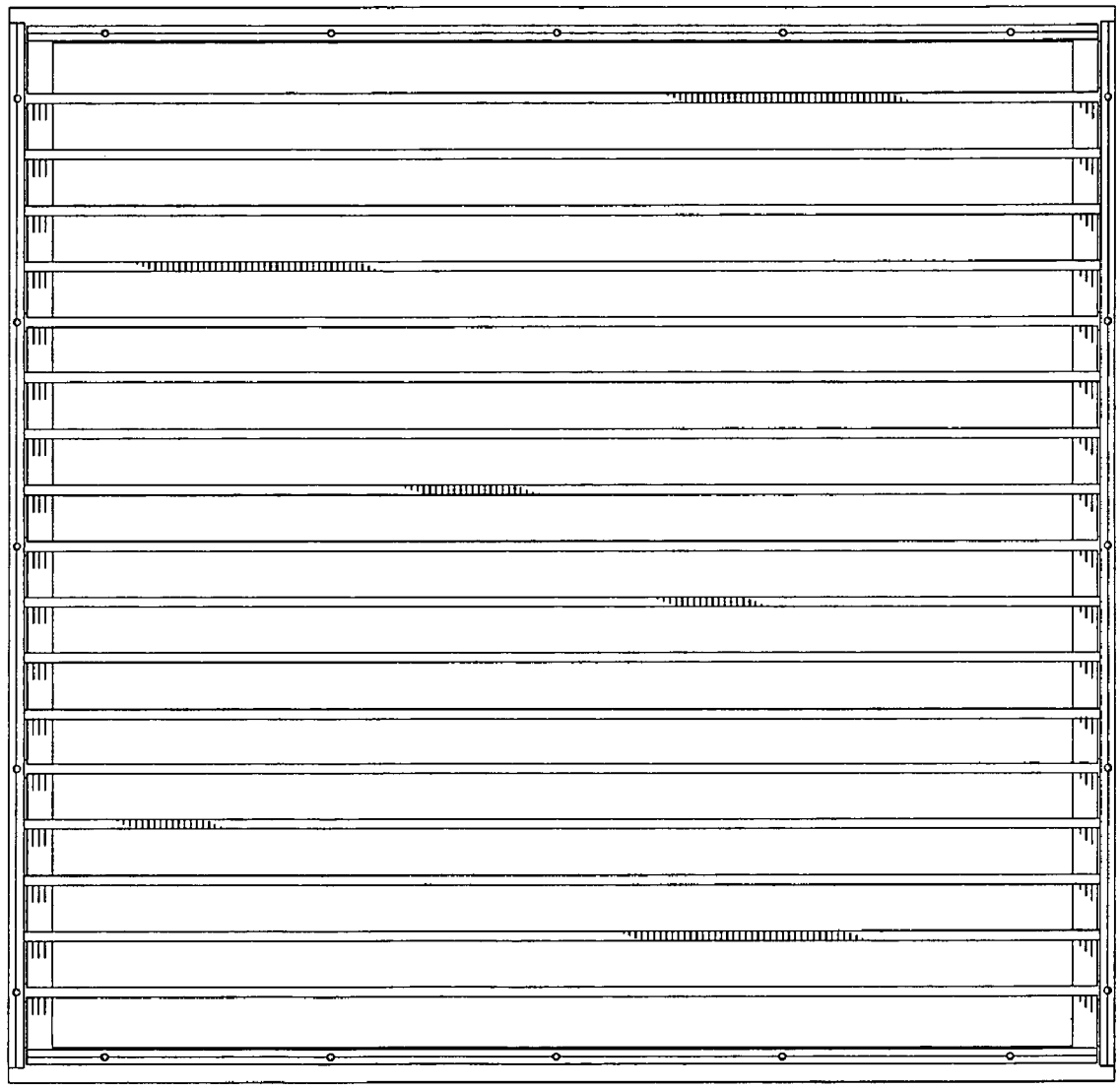
FIG. 13d is a schematic plan view of the example spacer shown in FIG. 13 looking down on the other or opposite major side as shown in FIG. 13 (i.e. the flip side)

FIG. 9 illustrates the form of a heat transfer or exchanger sheet exploitable with the spacer shown in FIG. 7. Such energy transfer media are known and can be made from numerous different materials, including specially treated paper sheets, fiberglass reinforced sheets or any other type suitable for the application. This leads to a very flexible manufacturing process.

FIG. 10 is a schematic perspective view of a plurality of the example spacers as shown in FIG. 7 in the process of being associated with a plurality of air to air energy exchanger sheets 110 (e.g. paper) as shown in FIG. 9. The frame member of FIG. 7 is configured such that one spacer may be stacked on an underlying spacer by first being oriented with respect to the underlying like spacer by being flipped over 180 degrees around the central longitudinal axis 112 passing through the central stiffening member 90 (see for example FIG. 7). In other words in order to be able to use the same spacer all across a heat recovery the core, the said like spacers need each to be flipped during assembly. Referring to FIG. 10, this means that one spacer 114 is mounted facing up and the underlying adjacent spacer 116 is mounted facing down, and so on and so forth. To ensure a good fit between membrane and spacers, the membrane is asymmetrical (see FIG. 9); thus each new additional energy transfer sheet in the assembly also has to be rotated by 180° (about the longitudinal axis passing through the center of the opposed major faces of the sheet) as compared to the immediately lower and upper sheets.

Thus as may be appreciated from FIG. 10 a spacer of FIG. 7 is stacked, major side to major side, on top of a second such spacer with an air to air energy exchanger sheet extending across the framed core openings and sandwiched between the frame members of said first and second spacers such that second offset interlock tongue elements register in respective offset second mortise elements and first interlock tongue elements register in respective first mortise elements so as to define a pair of transverse air (channels or) paths on opposite sides of the energy transfer sheet (see FIG. 12). The result is a core assembly as shown in FIG. 11.

The various elements of the core assembly shown in FIG. 11 may also be secured by using glue, e.g. by glueing the engagement surfaces of the frame members to the energy transfer sheets sandwiched therebetween. Alternatively, they may be secured by using suitably configured snap/lock elements (see FIGS. 18 and 19) disposed on the (e.g. plastic) spacers. Ultrasonic welding technique can also be used, even if snaps or glue is already used. It is advantageous to firmly hold the energy transfer media in place, especially when the said media reacts to environment conditions which may lead to expansion/contraction phenomenon due to heat and/or humidity variation.

Referring to FIG. 11a, this figure illustrates an example frame clamping assembly for mechanically maintaining in place the elements of the core assembly shown in FIG. 11. The frame clamping assembly has a pair of end plates or caps 120 for covering the bottom and top of the core assembly of FIG. 11. The frame clamping assembly also is provided with nut/bolt type fasteners (indicated generally by the reference numeral 122) which may take any form provided that they can be manipulated to urge the caps 120 towards each other so as to clamp elements of the core assembly in place. Thus a nut/bolt type fasteners 122 may comprise a post member 122a fixed at one end to the lower cap 120 and provided with a screw threaded opening at the other end thereof for engaging the threaded shaft of a bolt 122b, the head of which may be made to press down on the upper cap 120. The post members 122a may be sized so as to be able to be seated in the longitudinally extending notches 128 (see FIG. 11).

Referring back to FIG. 12, this figure shows an energy transfer core stage comprising two superimposed spacers having the configuration shown in FIG. 7 (with an intermediate energy transfer sheet normally disposed therebetween not shown for illustration purposes) and the resulting airflow paths which would be provided on opposite sides of the energy transfer sheet; the paths being represented by the arrows 130 and 132. The center portion of core stage is arranged in a way that the angle between the hot and cold airflows is 143°. This configuration results in a great value package, allowing good efficiency in a very compact arrangement.

Turning to FIGS. 13, 13a, 13b, 13c and 13d these figures are illustrative of an alternative spacer structure based on the spacer core shown in FIG. 3 and common elements will have common reference numerals. Thus the spacer is of square configuration. The spacer however also has an element of the spacer shown in FIG. 7. Thus the spacer has a plurality of parallel of air guide or rib elements (one of which is designated by the reference number 140) which serve the same purpose as those for the spacer in FIG. 7, namely to guide an air flow from one framed side opening to the other framed side opening. This alternate spacer also includes snap lock connector elements disposed on each major side e.g. female lock members disposed at the corners of the underside of the spacer and cooperating male lock members disposed on the upper side of the spacer; these lock members may take any suitable (known) form.

Referring top FIGS. 14, 15, 15a, 16, and 16a, these figures illustrate a further alternate spacer configuration which is also based on the square spacer structure shown in FIG. 3 and is associated with a square energy transfer sheet 144. However, this spacer variant includes other aspects of the spacer structure shown in respect to the spacer illustrated in FIG. 7. Thus the spacer 146 has a plurality of parallel of air guide or rib elements (one of which for each spacer shown is designated by the reference numeral 148) which serve the same purpose as those for the spacer in FIG. 7, namely to guide an air flow from one framed side opening 30 to the other framed side opening 30. The spacer also includes tongue/mortise elements. These elements may be gleaned from the enlarged views in FIGS. 15a and 16a. Each of the two opposed side opening components has an upper tongue element 150 and a lower mortise element 152 which are spaced apart to define a framed side opening 30. Each of the two opposed side wall components has an upper tongue element 154 and a lower mortise element 156. These tongue/mortise elements are as seen configured such that the spacer of FIG. 12 can be sequentially rotated 90 degrees about the axis 160 (see FIG. 14) so as to form the assembled core have air cross flow structure in the direction of the arrows shown with respect to FIG. 15.

For those spacers as shown in FIGS. 7, 13 and 14 which comprise one or more rib air guide elements disposed in the framed core opening, said rib air guide elements being connected to the frame member, the rib air guide elements may merely rest up against the adjacent air to air heat transfer sheet, i.e. they are not attached to nor integral with the air to air heat transfer sheet.

Figure 18:
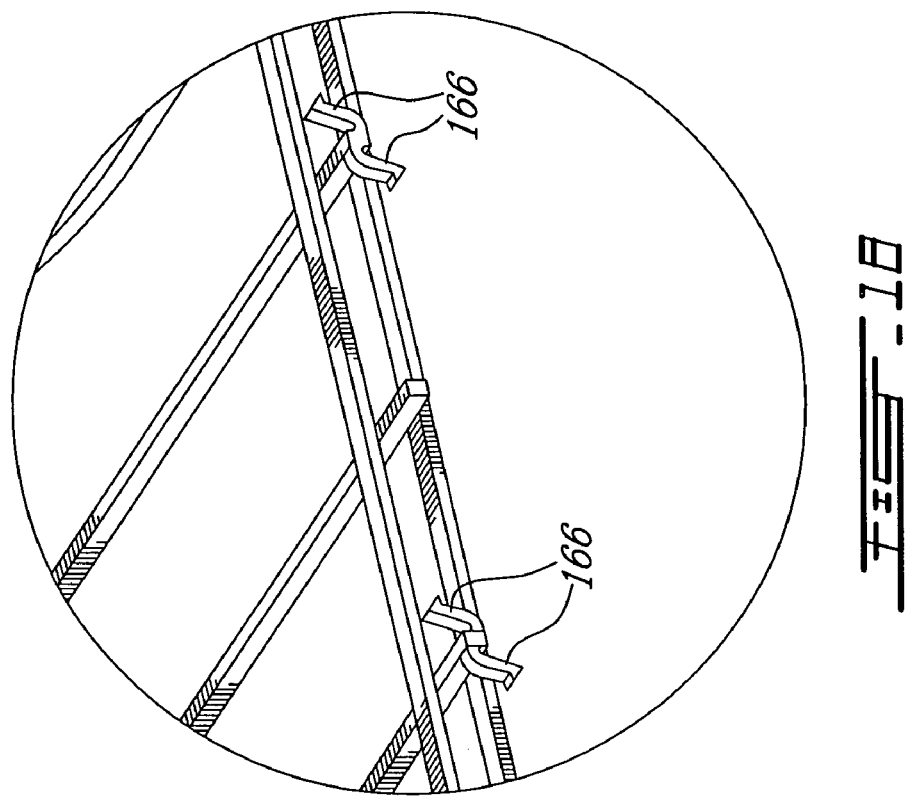
FIG. 18 is an enlarged view of an edge portion of another example spacer showing another type of snap means for interlocking adjacent spacers together at the edge portions thereof.
Figure 17:
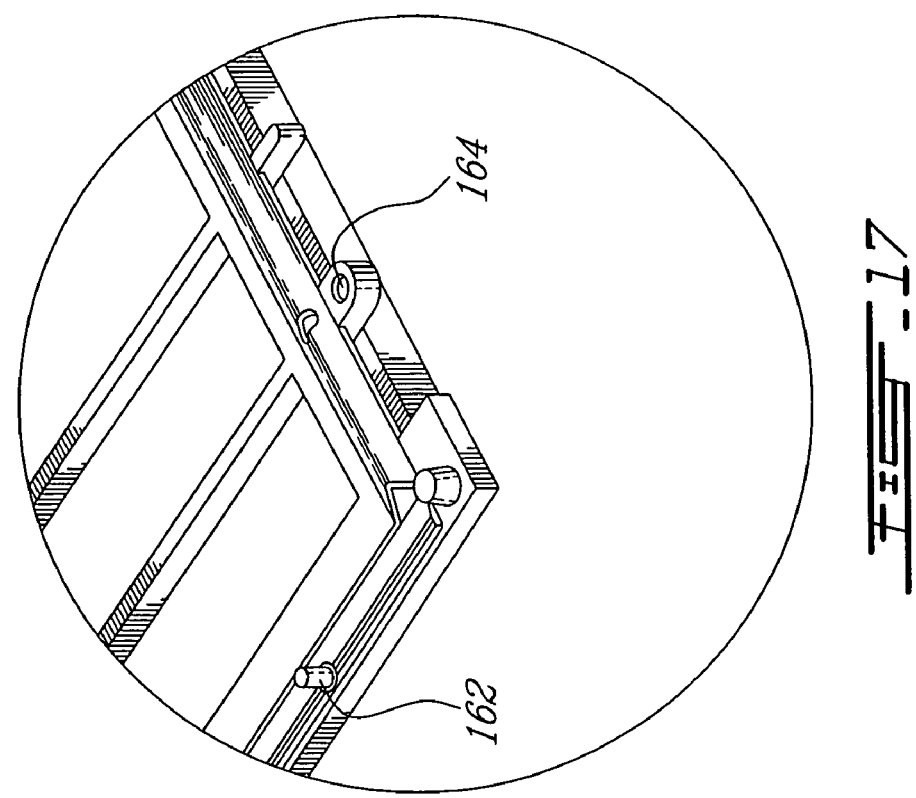
FIG. 17 is an enlarged view of an edge portion of a further example spacer showing snap means for interlocking adjacent spacers together at the edge portions thereof.

Referring to FIGS. 17 and 18, as mentioned above frame members of a core may be provided with snap lock connector elements. FIG. 17 illustrates a male and female approach to such connectors, i.e. a male element 162 is configured and disposed so as to be able to snap lock with the appropriately configured female element 164. FIG. 18 shows a snap hook type mechanism wherein respective resilient hook members 166 of adjacent spacers are able to cam over each other and then inter-hook each other.

Thus for example with respect to a snap lock means as shown in FIG. 17, a snap lock connector assembly may for example comprise an elongate male member snap lockable with a female member. One of such snap lock members may be associated with one major side of a frame member and the other being associated with the other side of the frame member. The elongate male member may have a generally bulbous outer end and a longitudinally extending intermediate portion attached to the frame member and being of smaller transverse cross-sectional dimensions than said bulbous outer end. The female member may also be connected to the frame member (on the other side thereof) and have an elongated, internal passageway having an opening of slightly smaller dimensions than the bulbous outer end of the male member. The female member may also have a longitudinally extending generally non-flexible portion of slightly larger inner dimensions than said bulbous outer end of said male member. One of said male and female members may comprise flexible, resilient material. The snap lock is effected by forcing the male bulbous outer end into the internal passageway of the female member; once inside the internal passageway the smaller opening of the female member will tend to lock the members together.

We claim:

1. A unitary stackable energy transfer core spacer comprising a peripheral frame member,
   said peripheral frame member extending about and defining a framed core opening,
   said peripheral frame member having a pair of opposed major sides,
   said peripheral frame member comprising
      a pair of side opening components and
      a pair of side wall components,
   each side opening component comprising a framed side opening in air communication with said framed core opening,
   each side wall component respectively interconnecting said side opening components,
said spacer being configured such that said spacer may be oriented and stacked, major side to major side, on top of a second like spacer, with an intermediate air to air energy transfer sheet extending across the framed core openings and being sandwiched between the frame members of both spacers so that the spacers and the energy transfer sheet define a pair of transversely oriented air paths on opposite sides of the energy transfer sheet, each air path extending from one respective framed side opening through a respective framed core opening to the other respective framed side opening of a respective spacer and wherein each side opening component comprises a first frame element and a second frame element, said first frame element and said second frame element being associated with a respective major side of the frame member, being spaced apart by a respective framed side opening and being offset with respect to each other such that one frame element does not overly the other frame element.

2. A stackable energy transfer core spacer as defined in claim 1 wherein peripheral frame member, said on each major side thereof, comprises an inter-registrable tongue/mortise interlock elements.

3. A stackable energy transfer core spacer as defined in claim 2 wherein said first frame element and said second frame element, of each side opening component, each define an inter-registrable tongue/mortise interlock element, wherein each side wall component defines a pair of offset inter-registrable tongue/mortise interlock elements, and wherein each interlock element of a side wall component is associated with a respective major side of the frame member and configured to be able to register with a predetermined tongue/mortise interlock element of a frame element of the frame member of said second like spacer so as to define a pair of interlocked elements.

4. A stackable heat transfer core spacer as defined in claim 1 having a hexagonal like configuration.

5. A stackable heat transfer core spacer as defined in claim 3 having a hexagonal like configuration and wherein each side wall component comprises a first side wall element and a second side wall element, said side opening components and said first and second wall elements being configured and disposed so as to provide the frame member with an hexagonal like shape, wherein a side opening component is connected to one side wall component by the first side wall element thereof and to the other side wall component by the second side wall component thereof, wherein each first side wall element defines a pair of offset inter-registrable tongue/mortise interlocks elements of said side wall component, and wherein each second side wall element defining a pair of aligned inter-registrable tongue/mortise interlock elements.

6. A stackable energy transfer core spacer as defined in claim 5 wherein the spacer comprises one or more rib air guide elements disposed in the framed core opening, said rib air guide elements being connected to the frame member.

7. A stackable energy transfer core spacer as defined in claim 6 wherein one or more of said rib air guide elements extend from one said framed side opening to the other framed side opening.

8. An air to air energy recovery core having a first air path and a separate second air path, each air path having a respective air inlet and a respective air outlet, said core comprising a stack of one or more successive heat transfer stages, each such stage comprising an energy transfer sheet having opposed major faces and a pair of spacers engaging opposite major faces of the sheet, each of said spacers being a spacer as defined in claim 1, said spacers being oriented and disposed relative to each other so that the spacers and the energy transfer sheet define a pair of transversely oriented air paths on opposite sides of the energy transfer sheet, each air path extending from one respective framed side opening through a respective framed core opening to the other respective framed side opening of a respective spacer, the framed side openings of one frame member each respectively defining a respective element of the air inlet and air outlet of the first air path and the framed side openings of the other frame member each respectively defining a respective element of the air inlet and air outlet of the second air path.

9. An air to air energy recovery core having a first air path and a separate second air path, each air path having a respective air inlet and a respective air outlet, said core comprising a stack of one or more successive heat transfer stages, each such stage comprising an energy transfer sheet having opposed major faces and a pair of spacers engaging opposite major faces of the sheet, each of said spacers being a spacer as defined in claim 7, said spacers being oriented and disposed relative to each other so that the spacers and the energy transfer sheet define a pair of transversely oriented air paths on opposite sides of the energy transfer sheet, each air path extending from one respective framed side opening through a respective framed core opening to the other respective framed side opening of a respective spacer, the framed side openings of one frame member each respectively defining a respective element of the air inlet and air outlet of the first air path and the framed side openings of the other frame member each respectively defining a respective element of the air inlet and air outlet of the second air path.

* * * * *